(12) United States Patent
Luo et al.

(10) Patent No.: US 12,581,484 B2
(45) Date of Patent: Mar. 17, 2026

(54) UPLINK TIMING METHOD AND COMMUNICATIONS APPARATUS

(71) Applicant: HUAWEI TECHNOLOGIES CO., LTD., Shenzhen (CN)

(72) Inventors: Hejia Luo, Hangzhou (CN); Xiaolu Wang, Hangzhou (CN); Ying Chen, Hangzhou (CN); Yu Wang, Hangzhou (CN); Yinggang Du, Shenzhen (CN); Rong Li, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 486 days.

(21) Appl. No.: 18/080,949

(22) Filed: Dec. 14, 2022

(65) Prior Publication Data

US 2023/0109710 A1     Apr. 13, 2023

Related U.S. Application Data

(63) Continuation of application No. PCT/CN2021/099992, filed on Jun. 15, 2021.

(30) Foreign Application Priority Data

Jun. 15, 2020 (CN) ........................ 202010544946.X
Sep. 24, 2020 (CN) ......................... 202011016139.7

(51) Int. Cl.
   *H04W 72/1268* (2023.01)
   *H04W 72/23* (2023.01)
(52) U.S. Cl.
   CPC ....... *H04W 72/1268* (2013.01); *H04W 72/23* (2023.01)

(58) Field of Classification Search
None
See application file for complete search history.

(56) References Cited

U.S. PATENT DOCUMENTS

2021/0105761 A1* 4/2021 Cheng ................... H04L 5/0053
2022/0046633 A1* 2/2022 Dinan ................... H04L 5/0053
2022/0376836 A1* 11/2022 Cheng ................... H04L 1/1812
(Continued)

OTHER PUBLICATIONS

3GPP TS 38.331 V17.0.0 (Mar. 2022), 3rd Generation Partnership Project, Technical Specification Group Radio Access Network, NR, Radio Resource Control (RRC) protocol specification, total 258 pages.
(Continued)

*Primary Examiner* — Srinivasa R Reddivalam
(74) *Attorney, Agent, or Firm* — WOMBLE BOND DICKINSON (US) LLP

(57) ABSTRACT

This application provides an uplink timing method. A half-duplex terminal device determines, based on a maximum timing advance of an area in which the terminal device is located and a set of time units used by the terminal device to receive a system message, a set of time units unavailable for uplink transmission, and in a process of calculating a time unit for sending an uplink signal, skips, based on a scheduling offset of the uplink signal, a time unit in the set of time units unavailable for uplink transmission, to avoid a problem that the half-duplex device needs to simultaneously perform receiving and sending in a large transmission latency scenario.

17 Claims, 10 Drawing Sheets

(56) References Cited

U.S. PATENT DOCUMENTS

2023/0049998 A1* 2/2023 Li ..................... H04W 72/1268

OTHER PUBLICATIONS

3GPP TSG RAN WG1 Meeting #97, R1-1906324, Physical layer procedure enhancement for NTN, CATT, Reno, USA, May 13-17, 2019, total 5 pages.
3GPP TS 38.211 V16.1.0 (Mar. 2020), 3rd Generation Partnership Project, Technical Specification Group Radio Access Network, NR, Physical channels and modulation, total 72 pages.
3GPP TS 38.213 V16.1.0 (Mar. 2020), 3rd Generation Partnership Project, Technical Specification Group Radio Access Network, NR, Physical layer procedures for control, total 156 pages.
3GPP TS 36.213 V16.1.0 (Mar. 2020), 3rd Generation Partnership Project, Technical Specification Group Radio Access Network, Evolved Universal Terrestrial Radio Access (E-UTRA), Physical layer procedures, total 7 pages.
3GPP TR 38.821 V16.0.0 (Dec. 2019), 3rd Generation Partnership Project, Technical Specification Group Radio Access Network, Solutions for NR to support non-terrestrial networks (NTN), total 140 pages.

* cited by examiner

UPLINK TIMING METHOD AND COMMUNICATIONS APPARATUS

CROSS-REFERENCE TO RELATED APPLICATIONS

This application is a continuation of International Application No. PCT/CN2021/099992, filed on Jun. 15, 2021, which claims priority to Chinese Patent Application No. 202011016139.7, filed on Sep. 24, 2020 and Chinese Patent Application No. 202010544946.X, filed on Jun. 15, 2020. The disclosures of the aforementioned applications are hereby incorporated by reference in their entireties.

TECHNICAL FIELD

This application relates to the communications field, and more specifically, to an uplink timing method and a communications apparatus.

BACKGROUND

Because a low-cost terminal device cannot simultaneously perform uplink scheduling and downlink receiving in an FDD half-duplex mode, when performing uplink scheduling, the low-cost terminal device needs to stagger a downlink slot (slot) or subframe (subframe) that needs to be received (a slot is used as a unit in NR, and a subframe is used as a unit in LTE).

However, a timing advance (timing advance, TA) is large in satellite communication (the TA is usually used by user equipment (user equipment, UE) to perform uplink transmission, and in order that an uplink data packet of the UE arrives at a network device at an agreed time point, a radio frequency transmission latency caused by a distance of the UE is estimated, and the data packet is sent a corresponding time period in advance), and the TA may be tens to hundreds of slots. Consequently, there may be a conflict between uplink transmission and downlink transmission of the low-cost terminal device.

SUMMARY OF THE INVENTION

This application provides an uplink timing method and a communications apparatus, to avoid a problem that a half-duplex apparatus needs to simultaneously perform receiving and sending in a large transmission latency scenario.

According to a first aspect, an uplink timing method is provided. The method includes: A first communications apparatus receives first configuration information. The first configuration information includes a first set, a scheduling offset of an uplink signal of the first communications apparatus, and an extension interval. The first set is a set of time units used by the first communications apparatus to receive a downlink system message, and the extension interval is greater than or equal to one time unit. The first communications apparatus determines, based on the scheduling offset of the uplink signal of the first communications apparatus and a second set, a time unit for sending the uplink signal. The second set is a set of time units that are determined based on the extension interval and the first set and that are unavailable for transmission of the uplink signal.

Optionally, the first communications apparatus may be a terminal device, or may be a chip or an integrated circuit installed in the terminal device.

In the technical solution, the terminal device determines, based on the extension interval and a set of time units used by the terminal device to receive a system message, the set of time units that are unavailable for uplink transmission, and in a process of calculating the time unit for sending the uplink signal, skips, based on the scheduling offset of the uplink signal, a time unit in an extended set of time units that are unavailable for uplink transmission, to avoid a problem that a half-duplex apparatus needs to simultaneously perform sending and receiving in a large transmission latency scenario.

Optionally, a set of time points corresponding to the time units in the second set in an uplink time sequence of the first communications apparatus includes a set of time points corresponding to all the time units in the first set in a downlink time sequence of the first communications apparatus.

With reference to the first aspect, in some implementations of the first aspect, that the second set is a set of time units that are determined based on the extension interval and the first set and that are unavailable for transmission of the uplink signal specifically includes: when the extension interval is m1 time units, the second set is a union set of each time unit in the first set and m1 consecutive time units after each time unit, where m1 is greater than or equal to a maximum timing advance in an area in which the first communications apparatus is located, or m1 is greater than or equal to a maximum timing advance of the first communications apparatus in a first time period.

In the technical solution, the first communications apparatus determines, based on a maximum timing advance in the area in which the first communications apparatus is located or a period of time and a set of time units used by the first communications apparatus to receive the system message, the set of time units that are unavailable for uplink transmission, and in the process of calculating the time unit for sending the uplink signal, skips, based on the scheduling offset of the uplink signal, the time unit in an extended set of time units that are unavailable for uplink transmission, to avoid a problem that the half-duplex apparatus needs to simultaneously perform sending and receiving in the large transmission latency scenario.

With reference to the first aspect, in some implementations of the first aspect, the first configuration information further includes an offset o, and that the second set is a set of time units that are determined based on the extension interval and the first set and that are unavailable for transmission of the uplink signal specifically includes: when the extension interval is m2 time units, the second set is a union set of each time unit in a third set and m2 consecutive time units after each time unit, and the third set is a set obtained by backward offsetting each time unit in the first set based on the offset o, where a sum of m2 and o is greater than or equal to a maximum timing advance in an area in which the first communications apparatus is located, and the offset o is less than or equal to a maximum common timing advance in the area in which the first communications apparatus is located; or a sum of m2 and o is greater than or equal to a maximum timing advance of the first communications apparatus in a second time period, and the offset o is less than or equal to a maximum common timing advance of the first communications apparatus in the second time period.

In the technical solution, the terminal device determines, based on a maximum timing advance in an area in which the terminal device is located or a period of time and a set of time units used by the terminal device to receive the system message, a range of the set of time units that are unavailable for uplink transmission, and in the process of calculating the time unit for sending the uplink signal, skips, based on the scheduling offset of the uplink signal, the time unit in the extended set of time units that are unavailable for uplink transmission, to avoid a problem that the half-duplex apparatus needs to simultaneously perform sending and receiving in the large transmission latency scenario. In addition, a quantity of time units that are unavailable for uplink transmission is reduced, so that the terminal device can provide a feedback as soon as possible.

With reference to the first aspect, in some implementations of the first aspect, the first communications apparatus determines a first extension interval and a first offset; the first communications apparatus sends the first extension interval and the first offset to a second communications apparatus, where a sum of the first extension interval and the first offset is greater than or equal to a timing advance of the first communications apparatus, and the first offset is less than or equal to the timing advance of the first communications apparatus; the first communications apparatus receives a feedback message sent by the second communications apparatus, where the feedback message includes a first time unit; and the first communications apparatus starts to use the first extension interval and the first offset in the first time unit based on the feedback information.

In the technical solution, the terminal device independently determines the extension interval and the offset, so that interaction overheads can be reduced, and utilization of an uplink slot can be improved. In the method, there is no special assumption about a network device and the terminal device, and the method is most commonly used.

With reference to the first aspect, in some implementations of the first aspect, the first communications apparatus sends a first time length to the second communications apparatus. The first time length is a time length in which the first extension interval and the first offset are valid.

With reference to the first aspect, in some implementations of the first aspect, the first communications apparatus receives a first message sent by the second communications apparatus, where the first message includes a second time unit, a second extension interval, and a second offset, where the second time unit is a time unit in which the first communications apparatus starts to use the second extension interval and the second offset, the second extension interval and the second offset are determined by the second communications apparatus based on a timing advance of the first communications apparatus, and the timing advance of the first communications apparatus is determined by the second communications apparatus based on location information of the first communications apparatus; and the first communications apparatus starts to use the second extension interval and the second offset in the second time unit based on the first message.

In the technical solution, there is highest efficiency when a network can obtain a location of the terminal device.

With reference to the first aspect, in some implementations of the first aspect, the first message further includes a second time length, and the second time length is a time length in which the second extension interval and the second offset are valid.

With reference to the first aspect, in some implementations of the first aspect, the first set is a set of sequence numbers corresponding to all the time units in the first set.

With reference to the first aspect, in some implementations of the first aspect, for each time unit in the first set, 0 or 1 is used to indicate that a corresponding time unit is a time unit for receiving the downlink system message.

With reference to the first aspect, in some implementations of the first aspect, when a parameter in the first configuration information needs to be adjusted, the first communications apparatus receives second configuration information. The second configuration information includes at least one updated parameter of the first set, the scheduling offset of the uplink signal of the first communications apparatus, and the extension interval.

In the technical solution, values such as the set of time units that are unavailable for uplink transmission, the extension interval, and the scheduling offset may be updated based on a geometric feature of a satellite beam, to meet a requirement that the geometric feature of the beam may be adjusted in satellite communication.

According to a second aspect, an uplink timing method is provided. The method includes: A second communications apparatus sends first configuration information. The first configuration information includes a first set, a scheduling offset of an uplink signal of a first communications apparatus, and an extension interval. The first set is a set of time units used by the first communications apparatus to receive a downlink system message, and the extension interval is greater than or equal to one time unit. The second communications apparatus determines, based on the scheduling offset of the uplink signal of the first communications apparatus and a second set, a time unit for receiving the uplink signal. The second set is a set of time units that are determined based on the extension interval and the first set and that are unavailable for transmission of the uplink signal.

Optionally, the second communications apparatus may be a network device, or may be a chip or an integrated circuit installed in the network device.

Optionally, a set of time points corresponding to the time units in the second set in an uplink time sequence of the first communications apparatus includes a set of time points corresponding to all the time units in the first set in a downlink time sequence of the first communications apparatus. With reference to the second aspect, in some implementations of the second aspect, that the second set is a set of time units that are determined based on the extension interval and the first set and that are unavailable for transmission of the uplink signal specifically includes: when the extension interval is m1 time units, the second set is a union set of each time unit in the first set and m1 consecutive time units after each time unit, where m1 is greater than or equal to a maximum timing advance in an area in which the first communications apparatus is located, or m1 is greater than or equal to a maximum timing advance of the first communications apparatus in a first time period.

With reference to the second aspect, in some implementations of the second aspect, the first configuration information further includes an offset o, and that the second set is a set of time units that are determined based on the extension interval and the first set and that are unavailable for transmission of the uplink signal specifically includes: when the extension interval is m2 time units, the second set is a union set of each time unit in a third set and m2 consecutive time units after each time unit, and the third set is a set obtained by backward offsetting each time unit in the first set based on the offset o, where a sum of m2 and o is greater than or equal to a maximum timing advance in an area in which the first communications apparatus is located, and the offset o is less than or equal to a maximum common timing advance in the area in which the first communications apparatus is located; or a sum of m2 and o is greater than or equal to a maximum timing advance of the first communications apparatus in a second time period, and the offset o is less than or equal to a maximum common timing advance of the first communications apparatus in the second time period.

With reference to the second aspect, in some implementations of the second aspect, the second communications apparatus receives a first extension interval and a first offset that are sent by the first communications, where the first extension interval and the first offset are determined by the first communications apparatus; and the second communications apparatus sends a feedback message to the first communications apparatus, where the feedback message includes a first time unit, and the first time unit is a time unit in which the first communications apparatus starts to use the first extension interval and the first offset.

With reference to the second aspect, in some implementations of the second aspect, the second communications apparatus receives a first time length sent by the first communications apparatus. The first time length is a time length in which the first extension interval and the first offset are valid.

With reference to the second aspect, in some implementations of the second aspect, the second communications apparatus obtains location information of the first communications apparatus; the second communications apparatus determines a timing advance of the first communications apparatus based on the location information; the second communications apparatus determines a second extension interval and a second offset based on the timing advance of the first communications apparatus; and the second communications apparatus sends a first message to the first communications apparatus, where the first message includes a second time unit, a second extension interval, and a second offset, and the second time unit is a time unit in which the first communications apparatus starts to use the second extension interval and the second offset.

With reference to the second aspect, in some implementations of the second aspect, the first message further includes a second time length, and the second time length is a time length in which the second extension interval and the second offset are valid.

With reference to the second aspect, in some implementations of the second aspect, the first set is a set of time unit sequence numbers corresponding to all the time units in the first set.

With reference to the second aspect, in some implementations of the second aspect, for each time unit in the first set, 0 or 1 is used to indicate that a corresponding time unit is a time unit for receiving the downlink system message.

With reference to the second aspect, in some implementations of the second aspect, when a parameter in the first configuration information needs to be adjusted, the second communications apparatus sends second configuration information to the first communications apparatus. The second configuration information includes at least one updated parameter of the first set, the scheduling offset of the uplink signal of the first communications apparatus, and the extension interval.

For technical effect of the second aspect or any possible implementation of the second aspect, refer to descriptions in the first aspect or any possible implementation of the first aspect. Details are not described herein again.

According to a third aspect, an uplink timing method is provided. The method includes: A first communications apparatus receives a second set and a scheduling offset of an uplink signal of the first communications apparatus. The second set is a set of time units that are determined based on an extension interval and a first set and that are unavailable for transmission of the uplink signal, the first set is a set of time units used by the first communications apparatus to receive a downlink system message, and the extension interval is greater than or equal to one time unit. The first communications apparatus determines, based on the scheduling offset and the second set, a time unit for sending the uplink signal.

Optionally, the first communications apparatus may be a terminal device, or may be a chip or an integrated circuit installed in the terminal device.

Optionally, a set of time points corresponding to the time units in the second set in an uplink time sequence of the first communications apparatus includes a set of time points corresponding to all the time units in the first set in a downlink time sequence of the first communications apparatus.

In the technical solution, a network device determines, based on a maximum timing advance in a cell in which the terminal device is located and a set of time units used by the terminal device to receive a system message, a set of time units that are unavailable to the terminal device for uplink transmission, and sends, to the terminal device, an extended set of time units that are unavailable for uplink transmission. In a process of calculating the time unit for sending the uplink signal, the terminal device skips, based on the scheduling offset of the uplink signal, a time unit in the extended set of time units that are unavailable for uplink transmission, to avoid a problem that a half-duplex apparatus needs to simultaneously perform sending and receiving in a large transmission latency scenario.

With reference to the third aspect, in some implementations of the third aspect, that the second set is a set of time units that are determined based on an extension interval and a first set and that are unavailable for transmission of the uplink signal specifically includes: when the extension interval is m1 time units, the second set is a union set of each time unit in the first set and m1 consecutive time units after each time unit, where m1 is greater than or equal to a maximum timing advance in an area in which the first communications apparatus is located, or m1 is greater than or equal to a maximum timing advance of the first communications apparatus in a first time period.

In the technical solution, a time point corresponding to the extended set of time units in an uplink time sequence of the terminal device includes a time point corresponding to the set of the time units that exists before extension in a downlink time sequence of the terminal device, to avoid a problem that the half-duplex apparatus needs to simultaneously perform sending and receiving in the large transmission latency scenario.

With reference to the third aspect, in some implementations of the third aspect, that the second set is a set of time units that are determined based on an extension interval and a first set and that are unavailable for transmission of the uplink signal specifically includes: when the extension interval is m2 time units, the second set is a union set of each time unit in a third set and m2 consecutive time units after each time unit, and the third set is a set obtained by backward offsetting each time unit in the first set based on an offset o, where a sum of m2 and o is greater than or equal to a maximum timing advance in an area in which the first communications apparatus is located, and the offset o is less than or equal to a maximum common timing advance in the area in which the first communications apparatus is located; or a sum of m2 and o is greater than or equal to a maximum timing advance of the first communications apparatus in a second time period, and the offset o is less than or equal to a maximum common timing advance of the first communications apparatus in the second time period.

In the technical solution, a time point corresponding to the extended set of time units in an uplink time sequence of the terminal device includes a time point corresponding to the set of the time units that exists before extension in a downlink time sequence of the terminal device, to avoid a problem that the half-duplex apparatus needs to simultaneously perform sending and receiving in the large transmission latency scenario. In addition, a quantity of time units that are unavailable for uplink transmission is reduced, so that the terminal device can provide a feedback as soon as possible.

With reference to the third aspect, in some implementations of the third aspect, the first set is a set of sequence numbers corresponding to all the time units in the first set.

With reference to the third aspect, in some implementations of the third aspect, for each time unit in the first set, 0 or 1 is used to indicate that a corresponding time unit is a time unit for receiving the downlink system message.

According to a fourth aspect, an uplink timing method is provided. The method includes: A second communications apparatus determines a second set based on an extension interval and a first set. The second set is a set of time units that are determined based on the extension interval and the first set and that are unavailable for transmission of an uplink signal. The first set is a set of time units used by a first communications apparatus to receive a downlink system message, and the extension interval is greater than or equal to one or more time units. The second communications apparatus sends the second set and a scheduling offset of an uplink signal of the first communications apparatus to the first communications apparatus. The second communications apparatus determines, based on the scheduling offset and the second set, a time unit for receiving the uplink signal.

Optionally, the second communications apparatus may be a network device, or may be a chip or an integrated circuit installed in the network device.

Optionally, a set of time points corresponding to the time units in the second set in an uplink time sequence of the first communications apparatus includes a set of time points corresponding to all the time units in the first set in a downlink time sequence of the first communications apparatus.

With reference to the fourth aspect, in some implementations of the fourth aspect, that the second set is a set of time units that are determined based on the extension interval and the first set and that are unavailable for transmission of an uplink signal specifically includes: when the extension interval is m1 time units, the second set is a union set of each time unit in the first set and m1 consecutive time units after each time unit, where m1 is greater than or equal to a maximum timing advance in an area in which the first communications apparatus is located, or m1 is greater than or equal to a maximum timing advance of the first communications apparatus in a first time period.

With reference to the third aspect, in some implementations of the third aspect, that the second set is a set of time units that are determined based on the extension interval and the first set and that are unavailable for transmission of an uplink signal specifically includes: when the extension interval is m2 time units, the second set is a union set of each time unit in a third set and m2 consecutive time units after each time unit, and the third set is a set obtained by backward offsetting each time unit in the first set based on an offset o, where a sum of m2 and o is greater than or equal to a maximum timing advance in an area in which the first communications apparatus is located, and the offset o is less than or equal to a maximum common timing advance in the area in which the first communications apparatus is located; or a sum of m2 and o is greater than or equal to a maximum timing advance of the first communications apparatus in a second time period, and the offset o is less than or equal to a maximum common timing advance of the first communications apparatus in the second time period.

With reference to the fourth aspect, in some implementations of the fourth aspect, the first set is a set of sequence numbers corresponding to all the time units in the first set.

With reference to the fourth aspect, in some implementations of the fourth aspect, for each time unit in the first set, 0 or 1 is used to indicate that a corresponding time unit is a time unit for receiving the downlink system message.

For technical effect of the fourth aspect or any possible implementation of the fourth aspect, refer to descriptions of the method in the third aspect or any possible implementation of the third aspect. Details are not described herein again.

According to a fifth aspect, a communications apparatus is provided. The communications apparatus has a function of implementing the method in the first aspect or any possible implementation of the first aspect, or the communications apparatus has a function of implementing the method in the third aspect or any possible implementation of the third aspect. The function may be implemented by hardware, or may be implemented by hardware executing corresponding software. The hardware or the software includes one or more units corresponding to the foregoing function.

According to a sixth aspect, this application provides a communications apparatus. The communications apparatus has a function of implementing the method in the second aspect or any possible implementation of the second aspect, or the communications apparatus has a function of implementing the method in the fourth aspect or any possible implementation of the fourth aspect. The function may be implemented by hardware, or may be implemented by hardware executing corresponding software. The hardware or the software includes one or more units corresponding to the foregoing function.

According to a seventh aspect, this application provides a terminal device, including a processor, a memory, and a transceiver. The memory is configured to store a computer program, and the processor is configured to: invoke and run the computer program stored in the memory, and control the transceiver to send and receive a signal, so that the terminal device performs the method in the first aspect or any possible implementation of the first aspect, or performs the method in the third aspect or any possible implementation of the third aspect.

According to an eighth aspect, this application provides a network device, including a processor, a memory, and a transceiver. The memory is configured to store a computer program, and the processor is configured to: invoke and run the computer program stored in the memory, and control the transceiver to send and receive a signal, so that the network device performs the method in the second aspect or any possible implementation of the second aspect, or performs the method in the fourth aspect or any possible implementation of the fourth aspect.

According to a ninth aspect, this application provides a computer-readable storage medium. The computer-readable storage medium stores computer instructions, and when the computer instructions are executed on a computer, the method in the first aspect or any possible implementation of the first aspect is implemented, or the method in the third aspect or any possible implementation of the third aspect is implemented.

According to a tenth aspect, this application provides a computer-readable storage medium. The computer-readable storage medium stores computer instructions, and when the computer instructions are executed on a computer, the method in the second aspect or any possible implementation of the second aspect is implemented, or the method in the fourth aspect or any possible implementation of the fourth aspect is implemented.

According to an eleventh aspect, this application provides a computer program product. The computer program product includes a computer program or code, and when the computer program or code is run on a computer, the method in the first aspect or any possible implementation of the first aspect is implemented; or the method in the third aspect or any possible implementation of the third aspect is implemented.

According to a twelfth aspect, this application provides a computer program product. The computer program product includes a computer program or code, and when the computer program or code is run on a computer, the method in the second aspect or any possible implementation of the second aspect is implemented; or the method in the fourth aspect or any possible implementation of the fourth aspect is implemented.

According to a thirteenth aspect, this application provides a communications apparatus, including a processor and a communications interface. The communications interface is configured to: receive a signal, and transmit the signal to the processor, and the processor processes the signal, so that the method in the first aspect or any possible implementation of the first aspect is performed; or the method in the third aspect or any possible implementation of the third aspect is performed.

According to a fourteenth aspect, this application provides a communications apparatus, including a processor and a communications interface. The communications interface is configured to: receive a signal, and transmit the signal to the processor, and the processor processes the signal, so that the method in the second aspect or any possible implementation of the second aspect is performed; or the method in the fourth aspect or any possible implementation of the fourth aspect is performed.

According to a fifteenth aspect, this application provides a wireless communications system, including the terminal device according to the seventh aspect and the network device according to the eighth aspect.

DESCRIPTION OF EMBODIMENTS

The following describes technical solutions of this application with reference to the accompanying drawings.

The technical solutions of embodiments of this application may be applied to various communications systems, such as a global system for mobile communications (Global System of Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD), a universal mobile telecommunications system (Universal Mobile Telecommunications System, UMTS), a worldwide interoperability for microwave access (Worldwide Interoperability for Microwave Access, WiMAX) communications system, a future 5th generation (5th Generation, 5G) system, a new radio (New Radio, NR) system, a device-to-device (Device-to-Device, D2D) communications system, a machine communications system, an Internet of vehicle communications system, a satellite communications system, or a future communications system.

Figures 1, 2:
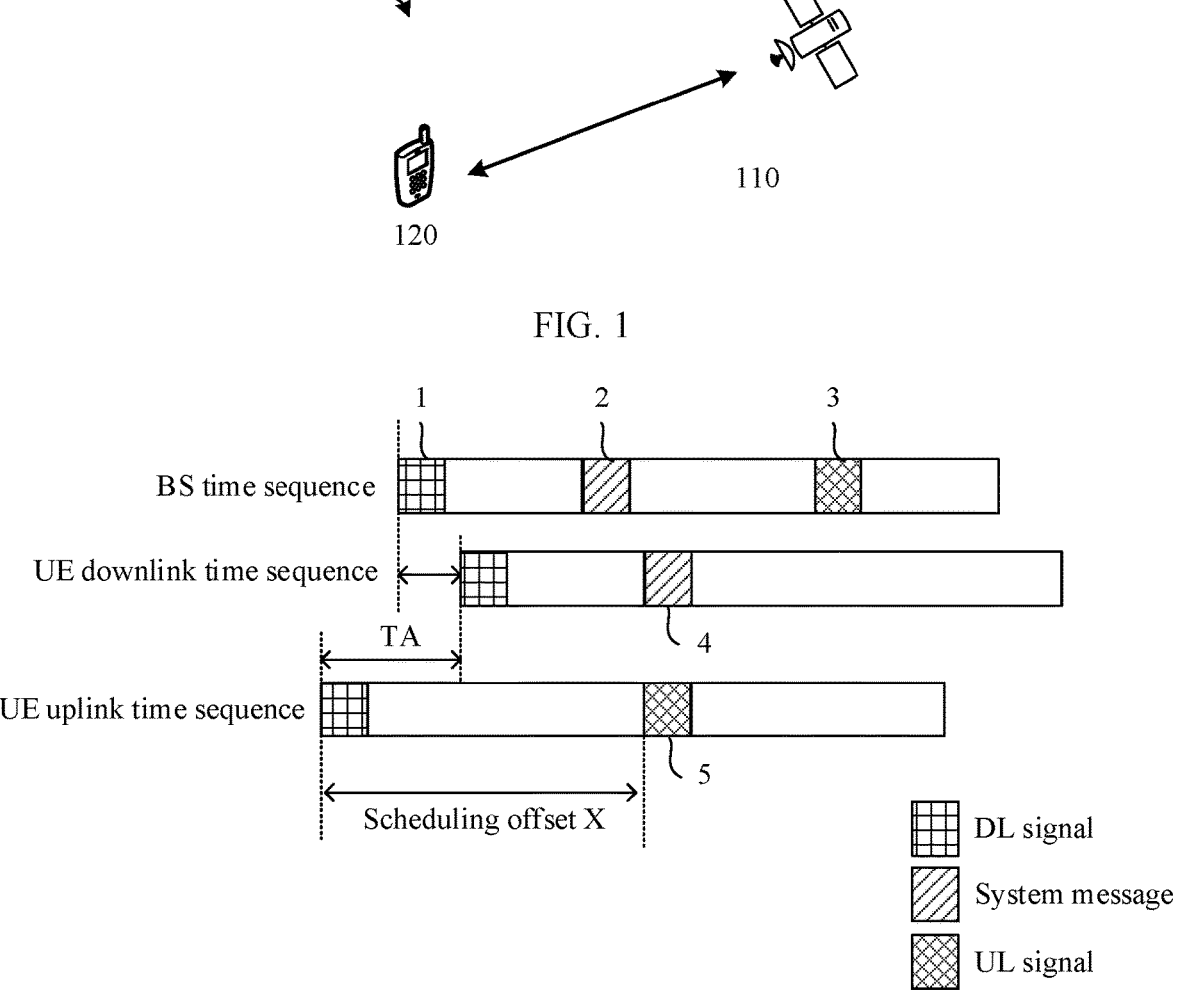
FIG. 1 is a schematic diagram of an architecture of a communications system applicable to an embodiment of this application.
FIG. 2 is a schematic diagram of a conflict between uplink transmission and downlink transmission of half-duplex UE in satellite communication.

To facilitate understanding of embodiments of this application, a communications system applicable to embodiments of this application is first described in detail with reference to FIG. 1. FIG. 1 is a schematic diagram of an architecture of a communications system applicable to an embodiment of this application. As shown in FIG. 1, a communications system 100 may include at least one network device, for example, a network device 110 shown in FIG. 1. The communications system 100 may further include at least one terminal device, for example, a terminal device 120 shown in FIG. 1. The network device 110 and the terminal device 120 may communicate through a wireless link.

In this embodiment of this application, the network device may be any device having a wireless transceiver function. The network device includes but is not limited to an evolved NodeB (evolved NodeB, eNB), a radio network controller (radio network controller, RNC), a NodeB (NodeB, NB), a home eNodeB (for example, a home evolved NodeB, or a home NodeB, HNB), a baseband unit (baseband unit, BBU), or an access point (access point, AP), a wireless relay node, a wireless backhaul node, a transmission point (transmission point, TP), a transmission and reception point (transmission and reception point, TRP), or the like in a wireless fidelity (wireless fidelity, Wi-Fi) system, or may be a gNB or a transmission point (TRP or TP) in a 5G (for example, NR) system, one or a group (including a plurality of antenna panels) of antenna panels of a base station in the 5G system, or may be a network node constituting a gNB or a transmission point, for example, a baseband unit (BBU), a distributed unit (distributed unit, DU), or the like, or may be a satellite, a satellite gateway station, or the like.

The network device in this embodiment of this application may alternatively be a central unit (central unit, CU) or a distributed unit (distributed unit, DU), or the network device may include a CU and a DU. It may be understood that the base station is divided into the CU and the DU from the perspective of a logical function. The CU and the DU may be physically separated, or may be deployed together. This is not specifically limited in this embodiment of this application. One CU may be connected to one DU, or a plurality of DUs may share one CU, to reduce costs and facilitate network extension. Division into the CU and the DU may be performed based on a protocol stack. A possible manner is to deploy a radio resource control (Radio Resource Control, RRC) layer, a service data adaptation protocol stack (Service Data Adaptation Protocol, SDAP) layer, and a packet data convergence protocol (Packet Data Convergence Protocol, PDCP) layer on the CU, and deploy other layers such as a radio link control (Radio Link Control, RLC) layer, a media access control (Media Access Control, MAC) layer, and a physical layer on the DU. The manner of performing division based on the protocol stack is not completely limited in the present invention, and there may be another division manner. For details, refer to TR 38.801 v14.0.0. The CU and the DU are connected through an F1 interface. The CU is connected to a core network through an Ng interface on behalf of the gNB.

The network device in this embodiment of this application may be a central unit control plane (CU-CP) node or a central unit user plane (CU-UP) node, or the network device may be a CU-CP and a CU-UP. The CU-CP is responsible for a control plane function, including an RRC function and a PDCP-C function. The PDCP-C function is mainly responsible for encryption and decryption of control plane data, integrity protection, data transmission, and the like. The CU-UP is responsible for a user plane function, including an SDAP function and a PDCP-U function. The SDAP function is mainly responsible for processing data of the core network and mapping a flow onto a bearer. The PDCP-U function is responsible for encryption and decryption of a data plane, integrity protection, header compression, sequence number maintenance, data transmission, and the like. The CU-CP and the CU-UP are connected through an E1 interface. The CU-CP is connected to the core network through an Ng interface on behalf of the gNB, and is connected to the DU by using F1-C (control plane). The CU-UP is connected to the DU by using F1-U (user plane). Certainly, another possible implementation is that the PDCP-C is also in the CU-UP. It should be noted that the CU may be classified as an access network device, or may be classified as a core network (core network, CN) device. This is not limited in this application.

The terminal device in embodiments of this application may also be referred to as user equipment (User Equipment, UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device in this embodiment of this application may be a mobile phone (mobile phone), a tablet (pad), a computer with a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in smart grid (smart grid), a wireless terminal in transportation safety (transportation safety), a wireless terminal in smart city (smart city), a wireless terminal in smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device, another processing device connected to a wireless modem, a vehicle-mounted device, a wearable device, a terminal device in a 5G network, a terminal device in a non-public network, or the like.

The wearable device may also be referred to as a wearable intelligent device, and is a general term for wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not merely a hardware device, but is used to implement a powerful function through software support, data interaction, and cloud interaction. In a board sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device may alternatively be a terminal device in an internet of things (internet of things, IoT) system. An IoT is an important component of future information technology development. A main technical feature of the IoT is that an object is connected to a network by using a communications technology, to implement an intelligent network in which human-machine interconnection and object-object interconnection are implemented.

The following describes a technical solution of this application in detail by using a satellite communications system as an example.

The satellite communication system includes a transparent satellite architecture and a non-transparent satellite architecture.

Transparent transmission is also referred to as bend pipe forwarding/transmission. In other words, only frequency conversion of a signal and signal amplification of the signal are performed on a satellite, and the satellite is transparent to the signal as if the satellite does not exist.

Non-transparent transmission is also referred to as regeneration (on-satellite access/processing) transmission. In other words, the satellite has some or all of base station functions.

To facilitate understanding embodiments of this application, terms used in this application are first briefly described.

1. Scheduling offset: In uplink resource scheduling of a cellular system, there needs to be a specific time interval between a time point at which UE receives an instruction from a BS and a time point at which data is prepared for uplink transmission. In descriptions in a protocol, the scheduling offset is usually described by using a period of offset time (a slot is used as a unit in NR, and a subframe is used as a unit in LTE) relative to a reference time. For example, a slot in which the instruction of the BS is received is n, and a slot in which uplink scheduling occurs is n+k (k≥1). It should be noted that, in a narrowband internet of things (narrowband internet of things, NB-IoT) system, instruction information of the BS may include a plurality of subframes. If a subframe that receives the instruction of the BS is n, it indicates that a last subframe that carries the instruction information is n.

It should be understood that the scheduling offset in this application may also be referred to as a scheduling latency. This is not specifically limited in this application.

2. Transmission latency: There needs to be a specific time interval between a time point at which UE sends uplink data and a time point at which a BS receives the uplink data. Usually, the time interval is understood as a transmission latency.

3. Bandwidth part (bandwidth part, BWP): The bandwidth part is a part of bandwidth in NR. In satellite communication, because multi-color multiplexing exists, one beam may be mapped onto one BWP, so that the BWP may be regarded as one satellite beam.

It should be noted that in cellular communication, because a transmission latency is far less than one slot (slot) or one subframe (subframe), a TA value is far less than one slot or subframe. For example, in uplink resource scheduling in a cellular system, a slot in which a terminal device receives an instruction sent by a network device is n, and uplink data is sent in a slot n+k (k≥1). Therefore, even if an uplink timing advance is considered, the terminal device still has a time period that is approximately equal to k slots or subframes to prepare uplink data.

However, in satellite communication, a TA may include tens to hundreds of slots. After the TA is considered, an original scheduling latency is insufficient to cover the TA, and an actual time point at which an uplink (uplink, UL) is sent is earlier than a time point at which a downlink instruction arrives. To solve the problem, in TR 38.821, an offset koffset is introduced to extend the scheduling latency. UL transmission slots of different UL transmission content in NR and a UL transmission slot that matches a satellite are shown in Table 1. The UL transmission content includes a physical uplink shared channel (physical uplink shared channel, PUSCH) scheduled based on downlink control information (downlink control information, DCI), a PUSCH scheduled based on a random access response (random access response, RAR), a hybrid automatic repeat request acknowledgment (hybrid automatic repeat request-acknowledgement, HARQ-ACK) transmitted on a physical downlink control channel (physical downlink control channel, PUCCH), a channel sounding reference signal (sounding reference signal, SRS), and the like.

TABLE 1

| UL transmission content | UL transmission slot in NR | UL transmission slot that matches a satellite | Variable interpretation |
|---|---|---|---|
| PUSCH scheduled based on DCI | $\left[n \times \frac{2^{\mu_{PUSCH}}}{2^{\mu_{PDCCH}}}\right] + k_2$ | $\left[n \times \frac{2^{\mu_{PUSCH}}}{2^{\mu_{PDCCH}}}\right] + k_2 + k_{offset}$ | Herein, n is a DCI slot in which current transmission is scheduled. $K_2$ is a time offset, and is related to subcarrier widths of a PUSCH and a PDCCH. A range of $K_2$ is from 0 to 32, and is indicated by using DCI. $\mu_{PUSCH}$ and $\mu_{PDCCH}$ are configuration parameters corresponding to the subcarrier widths. |
| PUSCH scheduled based on a RAR | $n + k_2 + \Delta$ | $n + k_2 + \Delta + k_{offset}$ | Herein, n is a sequence number of a slot in which a RAR ends. $K_2$ and $\Delta$ are configured by a network device. Reference is made to TS 38.214. |
| HARQ-ACK transmitted on a PUCCH | $n + k_1$ | $n + k_1 + k_{offset}$ | Herein, n is a sequence number of a slot in which a PDSCH ends. $K_1$ is indicated by using PDSCH-to-HARQ-timing-indicator in DCI or configured by using dl-DataToUL-ACK. |
| SRS | $\left[n \times \frac{2^{\mu_{SRS}}}{2^{\mu_{PDCCH}}}\right] + k$ | $\left[n \times \frac{2^{\mu_{SRS}}}{2^{\mu_{PDCCH}}}\right] + k + k_{offset}$ | Herein, n is a DCI slot in which current SRS transmission is scheduled, k is determined based on a higher layer parameter slotOffset, and $\mu_{SRS}$ and $\mu_{PDCCH}$ are configuration parameters corresponding to the subcarrier widths. |

It can be learned from the foregoing that, because the TA in satellite communication is large, there is a problem that low-cost UE may simultaneously performing receiving and sending.

FIG. 2 is a schematic diagram of a conflict between uplink transmission and downlink transmission of half-duplex UE in satellite communication.

As shown in FIG. 2, a first row indicates a time sequence of a base station (base station, BS), a second row indicates a time sequence in which UE receives a DL signal (namely, a downlink time sequence of the UE), and a third row is a time sequence in which UE sends a UL signal (namely, an uplink time sequence of the UE). A small square represents one transmission time slot. For example, the BS sends, in a slot corresponding to a location 1, data (namely, the downlink (downlink, DL) signal) for triggering uplink transmission (for example, an SRS, a PUSCH, or a HARQ-ACK) of the UE, and expects to receive a feedback (namely, the UL signal) of the UE in a slot corresponding to a location 3. In addition, the BS sends, in a slot corresponding to a location 2, a system message that the UE needs to listen to.

In a cellular scenario, a fluctuation range of a TA is very small and is usually far less than one slot. Therefore, regardless of a location at which the UE is located in a cell, from a perspective of the UE, when a slot is available for uplink transmission is calculated, provided that a slot in which the BS sends the system message that the UE needs to listen to is skipped, it is impossible that a time period in which the UE needs to send the UL signal and a time period in which the UE needs to listen to the system message sent by the BS overlap.

However, in a satellite scenario shown in FIG. 2, because a transmission latency in satellite communication is particularly large, a TA for sending the UL signal by the UE is correspondingly particularly large, and is usually greater than one slot. In this case, even if the slot in which the BS sends the system message that the UE needs to listen to is skipped when the UE calculates the slot that is available for uplink transmission, there may still be a problem that the UE simultaneously sends the UL signal in a slot corresponding to a location 4 and receives, in a slot corresponding to a location 5, a system message block delivered by the BS.

In an NR system, various system messages may be allocated at any location. To avoid occurrence of the foregoing problem, the system needs to support to configure a scheduling offset X very flexibly. Actually, the scheduling offset X cannot be flexibly configured in any scenario. Even if the scheduling offset X may be flexibly configured, a value range is also limited.

In view of this, this application provides a method, to avoid a problem that half-duplex UE needs to simultaneously perform uplink and downlink transmission in a large transmission latency scenario.

Figures 3, 4:
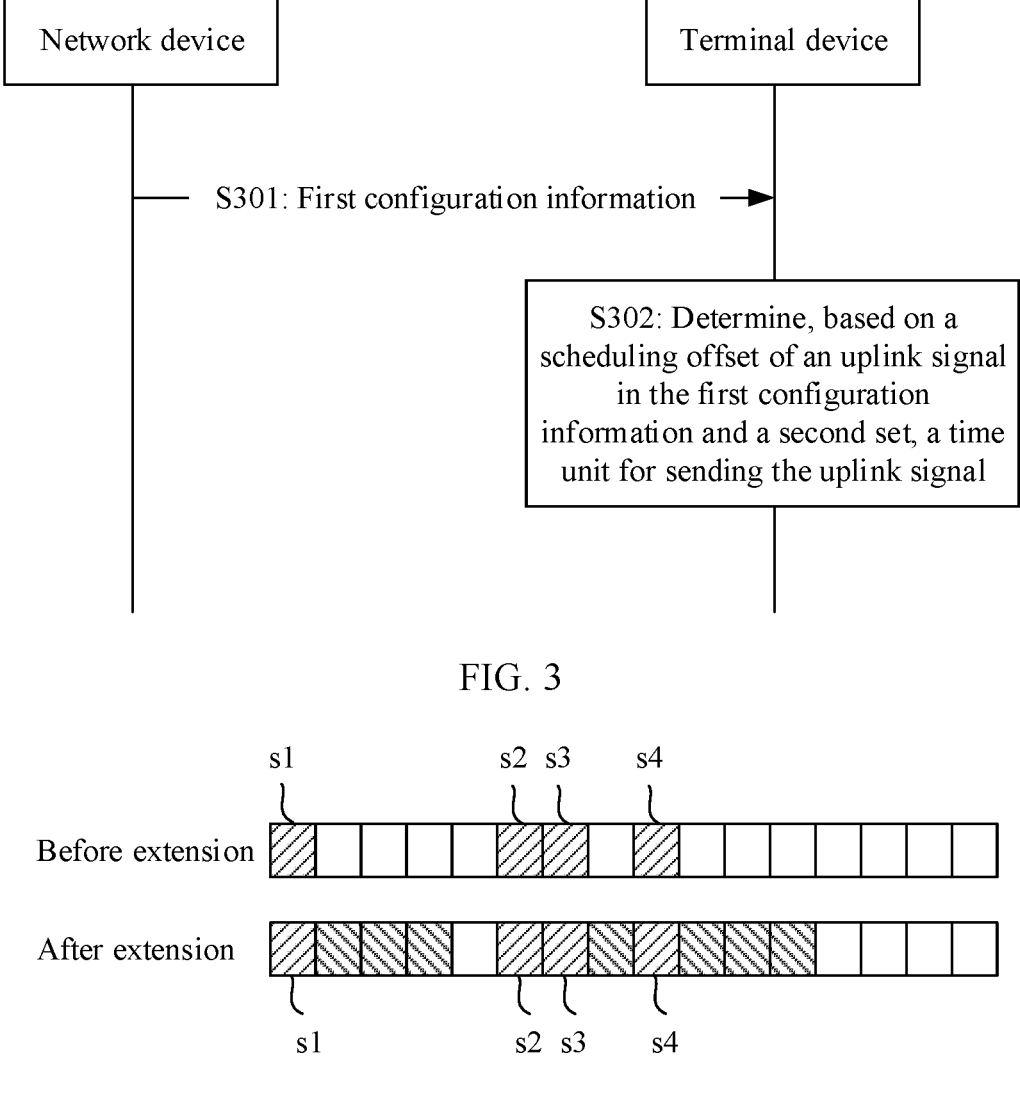
FIG. 3 is a schematic flowchart of an uplink timing method according to this application.
FIG. 4 shows a method for extending a slot that is unavailable for transmission of an uplink signal according to this application.

FIG. 3 is a schematic flowchart of an uplink timing method according to this application.

S301: A terminal device (namely, an example of a first communications apparatus) receives first configuration information.

Correspondingly, a network device (namely, an example of a second communications apparatus) sends the first configuration information.

The first configuration information includes a first set, a scheduling offset of an uplink signal of the terminal device, and an extension interval. The first set is a set of time units used by the terminal device to receive a downlink system message, the extension interval is greater than or equal to one time unit, and the extension interval is used to extend the time unit in the first set.

Optionally, the extension interval is greater than or equal to a maximum timing advance in an area in which the terminal device is located, or the extension interval is greater than or equal to a maximum timing advance of the terminal device in a period of time.

It should be understood that, in this application, the area in which the terminal device is located is a specific area that covers the location at which the terminal device is located. For example, the area may be an area covered by one or more satellites that cover the location at which the terminal device is located, an area covered by one or more air to ground (air to ground, ATG) base stations, an area covered by one or more cells, or an area covered by several beams in a cell. This is not specifically limited in this application. In an actual problem, a range of an area in which the terminal device is located may be determined based on a specific situation.

It should be understood that configuration information in the first configuration information depends on a geometric state of the beam. Therefore, the configuration information is different in a case of a different beam, a different satellite, and a parameter of an adjustable beam at a different moment. Therefore, a parameter in the first configuration information is changeable. When the parameter in the first configuration information needs to be adjusted, the network device sends second configuration information to the terminal device. The second configuration information includes at least one updated parameter of the first set, the scheduling offset of the uplink signal of the terminal device, and the extension interval.

In an example, the following are two typical scenarios in which a parameter needs to be adjusted. In a first scenario, a geometric state of a same beam/cell/BWP changes and needs to be updated. A second scenario is a handover scenario, and a related parameter of a target beam/cell/BWP needs to be notified.

(1) When the parameter in the first configuration information needs to be adjusted, the network device notifies the terminal device of an updated parameter based on the second configuration information (for example, RRC configuration information), or may further notify, based on the first configuration information, the terminal device of a time period in which the updated parameter is valid.

(2) When the terminal device needs to perform a beam (BWP) handover/cell handover/satellite handover, the network device notifies the terminal device in advance of a related configuration of a target beam (BWP) handover/cell handover/satellite by using the second configuration information.

Optionally, the time unit in this application may be a slot, or may be a subframe, a half frame, a symbol, a chip, or the like. This is not specifically limited in this application.

Optionally, the first set may alternatively be a set that is agreed on by the terminal device and the network device in advance.

Optionally, the first set may alternatively be a set specified in a protocol.

Optionally, for each time unit in the first set, 0 or 1 is used to indicate that a corresponding time unit is a time unit for receiving the downlink system message. For example, the first set is [00100110111]. 0 indicates the time unit for receiving the downlink system message, and 1 indicates a time unit that is available for UL transmission, or vice versa. This is not specifically limited in this application.

Optionally, the first set may alternatively be a sequence number set. For example, the first set is {s1, s2, . . . }. Herein, s1, s2, . . . represent time unit sequence numbers corresponding to the time unit for receiving the downlink system message.

It should be understood that, in this application, the time unit for receiving the downlink system message includes at least a time unit in which a system message is located and some time units that are allocated, reserved, or used for a specific purpose. NR is used as an example. The time unit of the downlink system message includes at least a slot in which system information (for example, synchronization signal block (synchronization signal and PBCH block, SSB) is located, or remaining minimum system information (remaining minimum system information, RMSI)) is located, and a slot used for a broadcast service, and further includes some slots in which the terminal device needs to listen to a receive message in some scenarios and that are not currently defined but may be allocated later. An NB-IoT system is used as an example. The time unit of the downlink system message includes at least slots of a transmission narrowband primary synchronization signal (narrowband primary synchronization signal, NPSS), a narrowband secondary synchronization signal (narrowband secondary synchronization signal, NSSS), a narrowband physical broadcast channel (narrowband physical broadcasting channel, NPBCH), and SystemInformationBlockType1-NB.

It can be learned from Table 1 that the terminal device has a plurality of types of uplink signals, and uplink scheduling of different uplink signals is described in a manner: Reference slot n+Scheduling offset X slots. The uplink signals listed in Table 1 are used as an example, scheduling offsets X that are of different uplink signals of the terminal device and that match a satellite are respectively:

(1) uplink scheduling triggered based on DCI: k2+koffset
(2) uplink scheduling triggered based on a RAR: k2+Δ+ koffset
(3) HARQ-ACK feedback: k1+koffset
(4) SRS sending triggered based on DCI: k+koffset S302: The terminal device determines, based on the scheduling offset of the uplink signal in the first configuration information and a second set, a time unit for sending the uplink signal.

The second set is a set of time units that are unavailable for transmission of the uplink signal and that are determined based on the extension interval and the first set, and a set of time points corresponding to the time unit in the second set in an uplink time sequence of the terminal device includes a set of time points corresponding to the time unit in the first set in a downlink time sequence of the terminal device, namely, the first communications apparatus.

It should be noted that, usually, the set of time points corresponding to the time units in the second set in the uplink time sequence of the terminal device includes a set of time points corresponding to all the time units in the first set in the downlink time sequence of the terminal device. However, in some cases, a time point corresponding to some time units in the first set in the downlink time sequence of the terminal device is prohibited from being used for uplink transmission. In this case, the set of time points corresponding to the time unit in the second set in the uplink time sequence of the terminal device may include only a set of time points corresponding to some time units in the first set in the downlink time sequence of the terminal device. This is not specifically limited in this application.

For ease of understanding, the following provides specific descriptions by using an example in which the time unit is a slot (slot) and the first set is a sequence number set. For example, in FIG. 2, the first set is a sequence number set {s1}. In other words, in the time sequence in the second row, a sequence number of a slot in which the terminal device receives the downlink system message is s1, and a corresponding time point at which the terminal device receives the downlink system message in the slot s1 is s'. Because a timing advance TA exists in uplink transmission of the terminal device, a corresponding time point at which the terminal device sends uplink data in the slot (it should be noted that, a sequence number corresponding to each slot in an uplink time sequence and a downlink time sequence of the terminal device is unchangeable) whose slot sequence number is s1 in the time sequence in the third row is (s'-TA). To ensure that a time point at which the terminal device receives downlink data does not conflict with a time point at which the terminal device sends the uplink data, a time point corresponding to a slot in which the terminal device sends the uplink signal in the time sequence in the third row needs to be different from s'. Therefore, it needs to be ensured that a time point corresponding to a slot in the second set in the time sequence in the third row includes the time point s'. Therefore, the terminal device may determine, based on the extension interval and the first set, a second set that meets the foregoing condition. Then, when the terminal device performs a slot offset based on the scheduling offset, a corresponding slot in the second set is skipped, to avoid a problem that there is a conflict between uplink transmission and downlink receiving of a half-duplex terminal device when the TA is large in satellite communication.

In an implementation, this application provides a method for extending the time unit that is unavailable for transmission of the uplink signal and that is determined based on the extension interval, as shown in FIG. 4.

FIG. 4 shows a method for extending a slot that is unavailable for transmission of an uplink signal according to this application.

When the extension interval is m1 time units, the second set is a union set of each time unit in the first set and m1 consecutive time units after each time unit. Herein, m1 is greater than or equal to a maximum timing advance in an area in which the terminal device is located, or m1 is greater than or equal to a maximum timing advance of the terminal device in a period of time.

For ease of understanding and description, the following provides descriptions by using an example in which the time unit is a slot (slot). As shown in FIG. 4, a set of sequence numbers corresponding to slots existing before extension is {s1, s2, s3, s4} (namely, an example of the first set). The extension interval m1=3 is used as an example. An extended set (namely, an example of the second set) of sequence numbers corresponding to slots is {s1, s1+1, s1+2, s1+3}∪{s2, s2+1, s2+2, s2+3}∪{s3, s3+1, s3+2, s3+3}∪{s4, s4+1, s4+2, s4+3}. Herein, ∪ indicates to obtain a union set.

The following describes how to determine the second set by using an example of the extended method shown in FIG. 4. It is assumed that the maximum timing advance in the cell in which the terminal device is located is 3. Therefore, a value range of the extension interval m1 is greater than or equal to 3, for example, m1=3, 4, or 5.

Figures 5, 6:
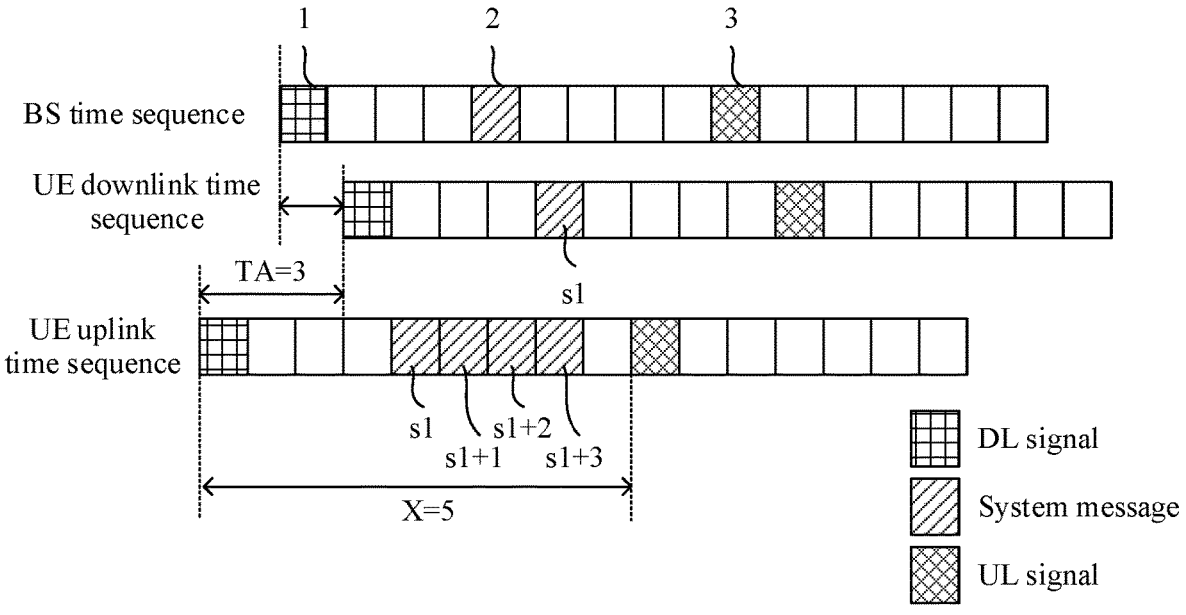
FIG. 5 is a schematic diagram of a process of extending a first set when a scheduling offset of a terminal device is X=5 and m1=3.
FIG. 6 shows another method for extending a slot that is unavailable for transmission of an uplink signal according to this application.

FIG. 5 is a schematic diagram of a process of extending a first set when a scheduling offset of a terminal device is X=5 and m1=3.

A first row indicates a time sequence of a BS, a second row indicates a time sequence in which UE receives a DL signal (namely, a downlink time sequence of the UE), and a third row is a time sequence in which the UE sends a UL signal (namely, an uplink time sequence of the UE). A small square represents one transmission time slot. For example, the BS sends, in a slot corresponding to a location 1, data (namely, the DL signal) for triggering uplink transmission of the UE, and expects to receive a feedback (namely, the UL signal) of the UE in a slot corresponding to a location 3. In addition, the BS sends, in a slot corresponding to a location 2, a system message that the UE needs to listen to, and the terminal device receives the system message in a slot whose slot sequence number is s1. In other words, the first set is {s1}. To ensure that the time point at which the terminal device receives the downlink data does not conflict with the time point at which the terminal device sends the uplink data, in the extension method in FIG. 4, an extended set (namely, an example of the second set) may be {s1, s1+1, s1+2, s1+3} (namely, a slashed part).

Then, the terminal device performs, based on the scheduling offset that is X=5, a backward offset of five slots from a first slot in a third time sequence, to determine a slot in which the uplink signal is sent. In an offset process, the extended set needs to be skipped. It can be learned that, when the terminal device performs a backward offset of four slots, there is exactly a slot whose slot sequence number is s1. In this case, the terminal device needs to send the uplink data in a slot whose slot sequence number is s1+5 by skipping all slots in the extended set {s1, s1+1, s1+2, s1+3}.

It should be noted that, in all embodiments of this application, before determining the slot that is unavailable for transmission of the uplink signal, the terminal device needs to mutually agree with the network device on a calculation rule for calculating the slot that is unavailable for transmission of the uplink signal. In this way, the terminal device determines a slot in which the uplink signal is sent, and the network device may determine, based on a same calculation method, a slot in which the uplink signal sent by the terminal device is received.

In the method, a range of a set of slots that are unavailable for UL transmission is extended based on a latency range of a cell, and a defined slot that is unavailable for UL transmission is skipped in an offset calculation process, to avoid a problem that a half-duplex apparatus needs to simultaneously perform uplink and downlink transmission in a large transmission latency scenario.

In another implementation, this application provides another method for extending the time unit that is unavailable for transmission of the uplink signal and that is determined based on the extension interval, as shown in FIG. 6.

FIG. 6 shows another method for extending a slot that is unavailable for transmission of an uplink signal according to this application.

Optionally, when the first configuration information includes an offset o, and the extension interval is m2 time units, the second set is a union set of each time unit in a third set and m2 consecutive time units after each time unit, and the third set is a set obtained by backward offsetting each time unit in the first set based on the offset o. A sum of m2 and o is greater than or equal to a maximum timing advance in an area in which the first communications apparatus is located, and the offset o is less than or equal to a maximum common timing advance in the area in which the first communications apparatus is located; or a sum of m2 and o is greater than or equal to a maximum timing advance of the first communications apparatus in a second time period, and the offset o is less than or equal to a maximum common timing advance of the first communications apparatus in the second time period.

It should be understood that m2 and o included in the first configuration information are used by the network device and the terminal device to calculate an element in the second set. A simple equivalent parameter configuration may also be used to achieve a same purpose. For example, m3 and o are indicated. Herein, m3=m2+o. In this case, m2 may be calculated by using the indicated m3 and o. Alternatively, m3 and m2 are indicated. Herein, m3=m2+o. In this case, o may be calculated by using m3 and m2. This is not specifically limited in this application. Information transferred by the foregoing options may be derived from each other. An example in which the configuration information includes m2 and o is used for detailed description below. It should be understood that the maximum common timing advance is a maximum common part of TA values of all terminal devices in the area in which the terminal device is located, or a maximum common part of TAs of the terminal device in a period of time. In a satellite or an ATG cell, a ratio of a common TA to a TA value of each terminal device is very large.

For ease of understanding and description, the following provides descriptions by using an example in which the time unit is a slot (slot). As shown in FIG. 6, a set (namely, an example of the first set) that is of sequence numbers corresponding to the slots and that exists before extension is {s1, s2, s3, s4}. For example, the extension interval is m2=3, and the offset is o=4. A set (namely, an example of the third set) obtained after a backward offset is performed based on the offset o=4 may be {s1+o, s2+o, s3+o, s4+o}, and then a set (namely, an example of the second set) is obtained after extension is performed based on the extension interval m2=3 is {s1+o, s1+o+1, s1+o+2, s1+o+3}∪{s2+o, s2+o+1, s2+o+2, s2+o+3}∪{s3+o, s3+o+1, s3+o+2, s3+o+3}∪{s4+o, s4+o+1, s4+o+2, s4+o+3}. Herein, ∪ indicates to obtain a union set. Alternatively, the set {s1, s2, s3, s4} may be extended based on the extension interval m2=3 to obtain a set A, and then the set A is backward offset based on the offset o=4. A finally obtained set result is the same as that in the previous method. Details are not described herein again.

The following describes how to determine the second set by using an example of the extended method shown in FIG. 6. It is assumed that the maximum timing advance in the area in which the terminal device is located is 7, and the maximum common timing advance in the area in which the terminal device is located is 5. Therefore, m2+o≥7, and 0<o≤5. For example: value ranges of m2 and o may be m2+o=7, 8, or 9 and o=5, or m2+o=7, 8, or 9 and o=4, or m2+o=7, 8, or 9 and o=3, or the like.

Figures 7, 8:
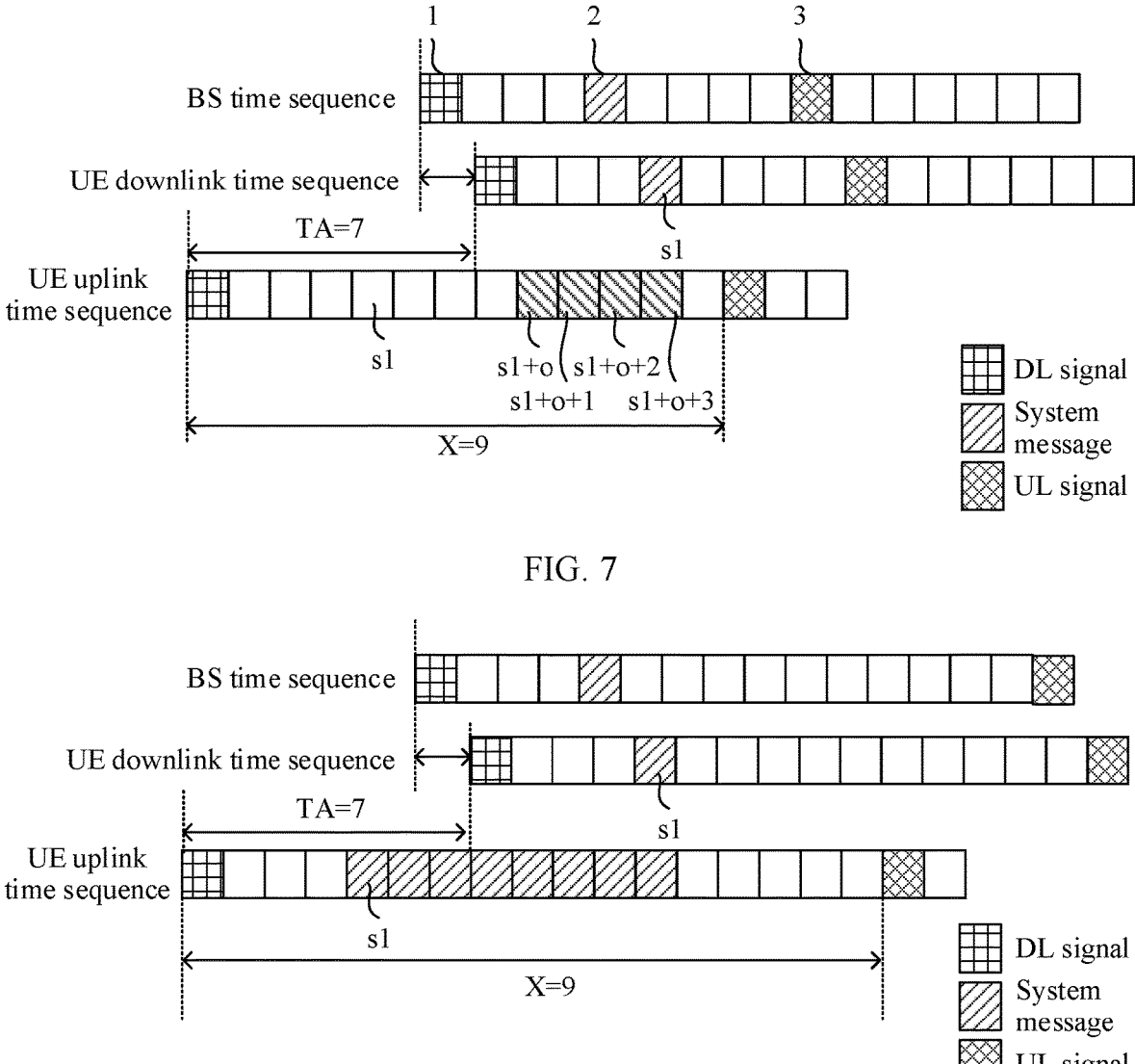
FIG. 7 is a schematic diagram of a process of extending a first set when a scheduling offset of a terminal device is X=5, m2=3, and o=4.
FIG. 8 is a schematic diagram of a process of extending a first set when a scheduling offset of a terminal device is X=5 and m1=7.

FIG. 7 is a schematic diagram of a process of extending a first set when a scheduling offset of a terminal device is X=5, m2=3, and o=4.

A first row indicates a time sequence of a BS, a second row indicates a time sequence in which UE receives a DL signal (namely, a downlink time sequence of the UE), and a third row is a time sequence in which the UE sends a UL signal (namely, an uplink time sequence of the UE). A small square represents one transmission time slot. For example, the BS sends, in a slot corresponding to a location 1, data (namely, the DL signal) for triggering uplink transmission of the UE, and expects to receive a feedback (namely, the UL signal) of the UE in a slot corresponding to a location 3. In addition, the BS sends, in a slot corresponding to a location 2, a system message that the UE needs to listen to, and the terminal device receives the system message in a slot whose slot sequence number is s1. In other words, the first set is {s1}. To ensure that the time point at which the terminal device receives the downlink data does not conflict with the time point at which the terminal device sends the uplink data, in the extension method in FIG. 6, an extended set (namely, the second set) of slot sequence numbers may be {s1+o, s1+o+1, s1+o+2, s1+o+3}.

It should be noted that, in the method, when the terminal device determines the slot for sending the uplink signal, the terminal device needs to perform a backward offset of nine (namely, 5+4) slots from a first slot in a third time sequence based on the scheduling offset that is X=5 and the offset that is o=4, to determine the slot for sending the uplink signal. In an offset process, an extended set needs to be skipped. For example, it can be learned from FIG. 7 that after the terminal device performs a backward offset of eight slots, there is exactly a slot whose slot sequence number is s1+o. In this case, the terminal device needs to send uplink data in a slot whose slot sequence number is s1+o+5 by skipping all slots in an extended set {s1+o, s1+o+1, s1+o+2, s1+o+3}.

In the method, a range of a set of slots that are unavailable for UL transmission is extended based on a differential latency range of a cell, and a defined slot that is unavailable for UL transmission is skipped in an offset calculation process, to avoid a problem that a half-duplex apparatus needs to simultaneously perform uplink and downlink transmission in a large transmission latency scenario in which there is a common latency.

In addition, compared with the extended method in FIG. 4, in the method, a case in which a common TA exists in a cell is considered, and a quantity of slots that are unavailable for UL transmission is reduced, so that the UE can provide a feedback as soon as possible. This application provides specifically describes beneficial effect with reference to FIG. 7 and FIG. 8. FIG. 8 is a schematic diagram of extending a first set in the embodiment in FIG. 7 by using a first extension method (the extension method corresponding to FIG. 4).

FIG. 8 is a schematic diagram of a process of extending a first set when a scheduling offset of a terminal device is X=5 and m1=7.

A maximum TA value in the area in which the terminal device is located is also 7. It may be learned from FIG. 7 and FIG. 8 that, in a time sequence in a third row, a slot sequence number of a slot in which the UE receives the downlink system message is s1. If the first extension method (the extension method corresponding to FIG. 4) is used, when m1=7, the slot whose slot sequence number is s1 and m1 consecutive slots after the slot are unavailable for uplink transmission. If a second extension method (the extension method corresponding to FIG. 6) is used, when m2+o=7 and m2=3, in a time sequence in a third row, the terminal device performs a backward offset of o (o=4) slots from the slot whose slot sequence number is s1, and a slot whose slot sequence number is s1+o and m2 consecutive slots after the slot are unavailable for uplink transmission. It can be learned that, compared with FIG. 7 and FIG. 8, eight slots in an extended set are unavailable for uplink transmission in the method 1, and four slots in an extended set are unavailable for uplink transmission in the method 2. In this case, when m1=m2+o=7, in the second extension method, a quantity of some slots that are unavailable for UL transmission (namely, a quantity of slots that are a common offset) is actually reduced, so that the UE can provide a feedback as soon as possible.

Based on the embodiment, a value of o may be further optimized based on a TA value of the terminal device, to reduce the quantity of slots that are unavailable for UL transmission.

Figure 9:
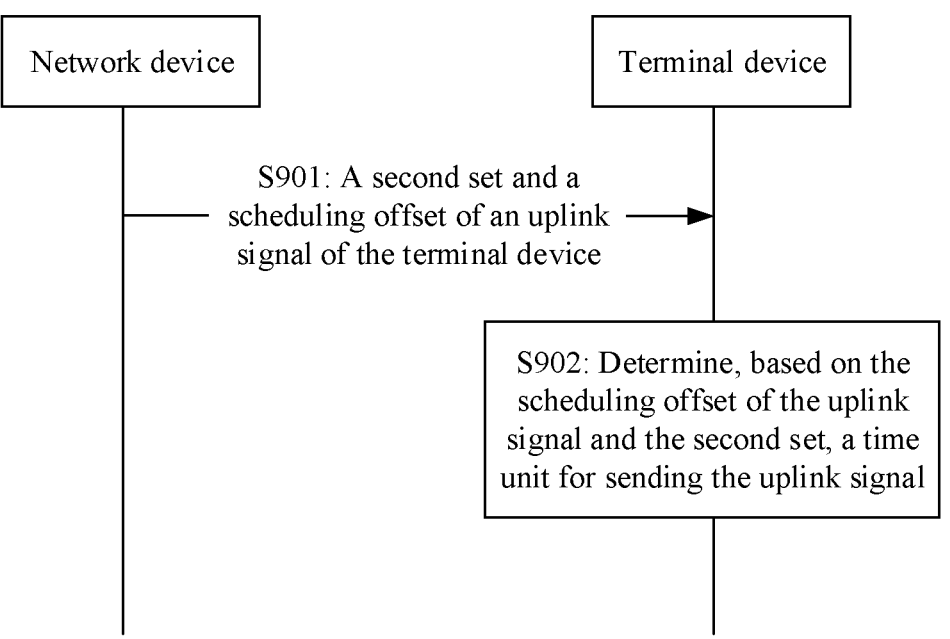
FIG. 9 is a schematic flowchart of another uplink timing method according to this application.

FIG. 9 is a schematic flowchart of another uplink timing method according to this application.

S901: A terminal device receives a second set and a scheduling offset of an uplink signal of the terminal device that are sent by a network device.

Correspondingly, the network device sends the second set and the scheduling offset of the uplink signal of the terminal device to the terminal device.

The second set is a set of time units that are determined based on an extension interval and a first set and that are unavailable for transmission of the uplink signal. The first set is a set of time units used by the terminal device to receive a downlink system message, and the extension interval is greater than or equal to a maximum timing advance in a cell in which the terminal device is located.

Optionally, the time unit in this application may be a slot, or may be a subframe. This is not specifically limited in this application.

Optionally, the first set may alternatively be agreed on by the terminal device and the network device in advance.

Optionally, the first set may alternatively be a set specified in a protocol.

Optionally, for each time unit in the first set, 0 or 1 is used to indicate that a corresponding time unit is a time unit for receiving the downlink system message. For example, the first set is [00100110111]. 0 indicates the time unit for receiving the downlink system message, and 1 indicates a time unit that is available for UL transmission, or vice versa. This is not specifically limited in this application.

Optionally, the first set may alternatively be a sequence number set. For example, the first set is {s1, s2, . . . }. Herein, s1, s2, . . . represent sequence numbers corresponding to the time unit for receiving the downlink system message.

For ease of understanding, the following provides specific descriptions by using an example in which the time unit is a slot (slot) and the first set is a sequence number set. For example, in FIG. 2, the first set is a sequence number set {s1}. In other words, in a time sequence in a second row, a sequence number of a slot in which the terminal device receives the downlink system message is s1, and a corresponding time point at which the terminal device receives the downlink system message in the slot s1 is s'. Because a timing advance TA exists in uplink transmission of the terminal device, a corresponding time point at which the terminal device sends uplink data in the slot (it should be noted that, a sequence number corresponding to each slot in an uplink time sequence and a downlink time sequence of the terminal device is unchangeable) whose slot sequence number is s1 in the time sequence in the third row is (s'-TA). To ensure that a time point at which the terminal device receives downlink data does not conflict with a time point at which the terminal device sends the uplink data, a time point corresponding to a slot in which the terminal device sends the uplink data in the time sequence in the third row needs to be different from s'. Therefore, it needs to be ensured that a time point corresponding to a slot in the second set in the time sequence in the third row is equal to or includes the time point s'. Therefore, the network device may determine, based on the extension interval and the first set, a second set that meets the foregoing condition, and send the second set to the terminal device, to avoid a problem that there is a conflict between uplink transmission and downlink receiving of a half-duplex terminal device when the TA is large in satellite communication.

A method for determining the second set by the network device is the same as a method for determining the second set by the terminal device. For a specific implementation, refer to descriptions in FIG. 4 to FIG. 7. Details are not described herein again.

S902: The terminal device determines, based on the scheduling offset of the uplink signal and the second set, a time unit for sending the uplink signal.

When the terminal device performs a slot offset based on the scheduling offset, the problem that there is a conflict between uplink transmission and downlink receiving of the half-duplex terminal device when the TA is large in satellite communication can be avoided by skipping a corresponding slot in the second set. For a specific implementation in which the terminal device determines the time unit for sending the uplink signal, refer to descriptions in FIG. 5 and FIG. 7. Details are not described herein again.

In the technical solution, the network device directly notifies the terminal device of a set of time units that are unavailable for transmission of the uplink signal, and the terminal device does not need to independently perform calculation, to reduce calculation power of the terminal device.

Optionally, in this embodiment, values of the extension interval and the offset may be configured as a cell-level parameter.

Optionally, when a cell includes a plurality of beams, values of the extension interval and the offset may alternatively be configured as a beam-level parameter.

Figure 10:
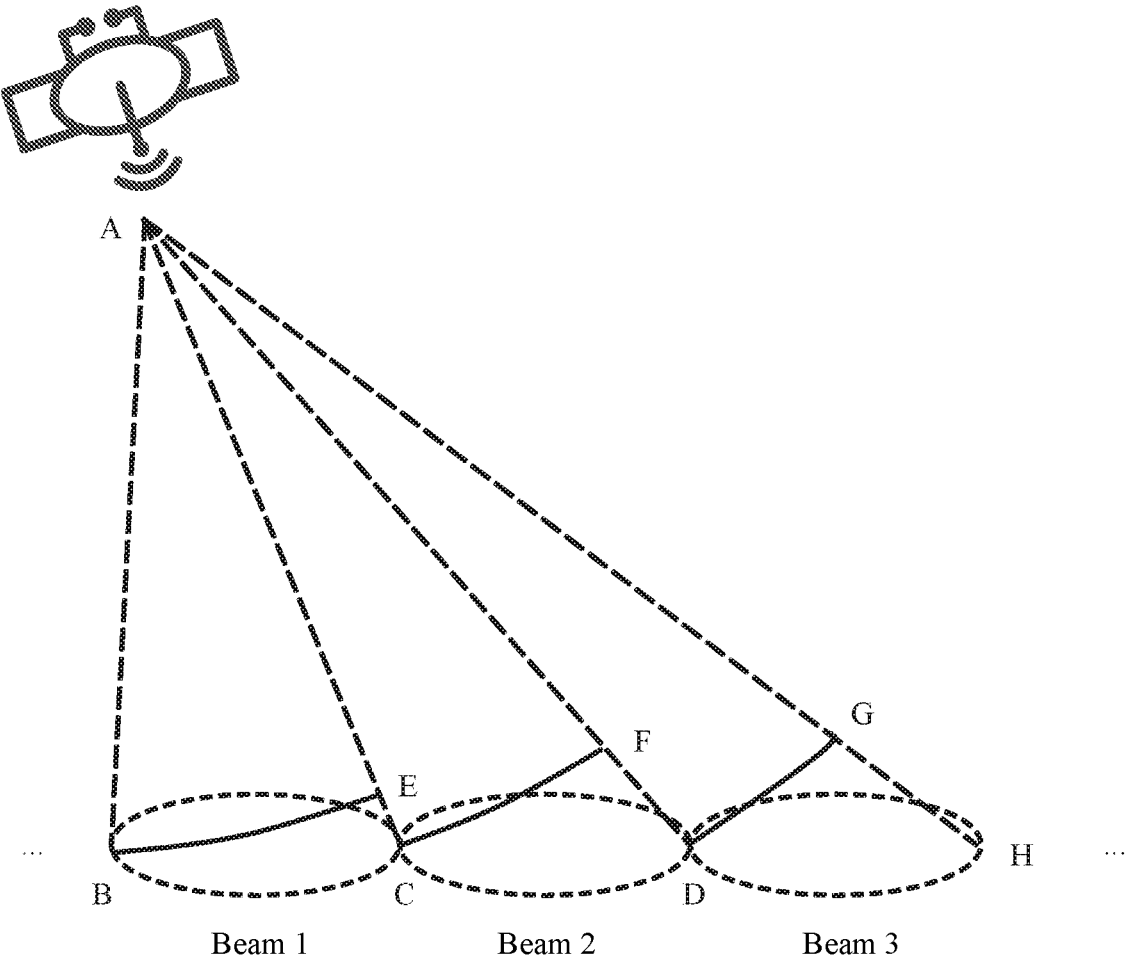
FIG. 10 is a schematic diagram of different maximum common latencies and different differential latencies of beams at different locations under a satellite.

FIG. 10 is a schematic diagram of different maximum common latencies and different differential latencies of beams at different locations under a satellite. For example, a logical entity corresponding to one beam may be an SSB or a BWP, or one beam in a protocol may correspond to one or more pilot ports. For example, each port in NR and LTE corresponds to one channel state information reference signal (channel state information reference signal, CSI-RS) port. Therefore, value configurations of the extension interval and the offset may be used as a part of a port-related configuration. A configuration of the CSI-RS port in NR is usually carried in transmission configuration indicator (transmission configuration indicator, TCI) configuration information. Similarly, when the beam is mapped onto the SSB and the BWP, value configurations of the extension interval and the offset may be carried in a related configuration of configuring the SSB and the BWP. Therefore, when a cell includes a plurality of beams, values of the extension spacing and the offset may vary with the SSB, the BWP, or the pilot (for example, a CSI-RS) port. FIG. 10 is used as an example. It is assumed that the base station is on a satellite, a line segment AB=AE, and the line segments AB and AE correspond to a maximum common latency of a beam 1; a line segment AC=AF, and the line segments AC and AF correspond to a maximum common latency of a beam 2; a line segment AD=AG, and the line segments AD and AG correspond to a maximum common latency of a beam 3; a line segment EC corresponds to a maximum differential latency of the beam 1; a line segment FD corresponds to a maximum differential latency of the beam 2; and a line segment GH corresponds to a maximum differential latency of the beam 3. Therefore, different beams generated by the satellite are different due to different geometric characteristics, also have different offsets and extension intervals, and correspondingly, each have an optimal set of slots that are unavailable uplink transmission. In this way, the network device configures different extension intervals and offsets for each beam, to finely configure a parameter, and improve utilization efficiency of uplink resources. When values of extension intervals and offsets of the plurality of beams in the cell have a large difference, beneficial effect of this design are obvious.

In an implementation, an optimal extension interval and offset depend on a timing advance used by a terminal in a communication process. The terminal may notify the network device of the timing advance or an optimal (or recommended) extension interval and offset of the terminal. However, the terminal usually feeds back the timing advance or the optimal extension interval and offset of the terminal, causing signaling overhead load and a waste of an uplink slot.

In view of this, this application provides a method for determining an extension interval and an offset by a terminal device, to reduce signaling overheads and a waste of an uplink slot.

Figure 11:
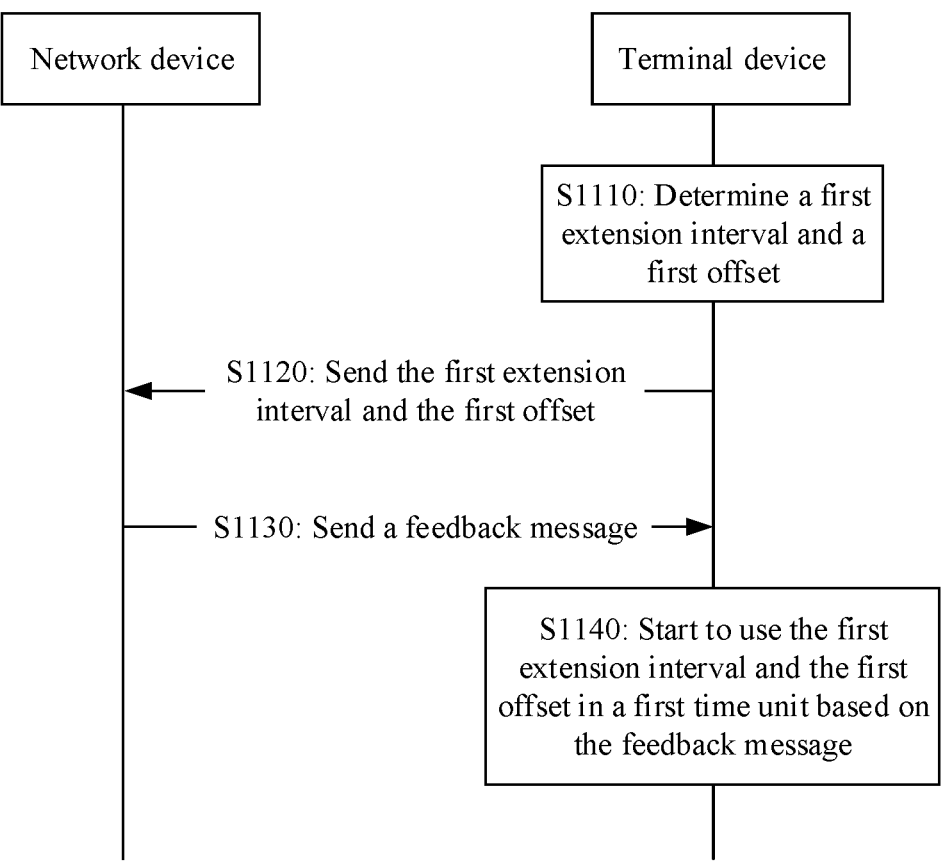
FIG. 11 is a schematic block diagram of a method for determining an uplink timing parameter by a terminal device according to this application.

FIG. 11 is a schematic block diagram of a method for determining an uplink timing parameter by a terminal device according to this application.

S1110: A terminal device determines a first extension interval and a first offset.

The terminal device predicts and calculates, based on a timing advance of the terminal device, and a location and motion information of a satellite, values of the first extension interval and the first offset that are suitable for the terminal device and can remain for a long period of time. Values of an extension interval and an offset may be set conservatively, so that the values can remain valid for a long period of time. In the method, comprehensive interaction overheads can be reduced, and utilization of an uplink slot can be improved.

S1120: The terminal device sends the first extension interval and the first offset to a network device.

Optionally, the terminal device sends a first time length to the network device. The first time length is a time length to which the first extension interval and the first offset can be applied.

The following constraint is imposed on a value range of values of the first extension interval m3 and the offset o1 in a time period in which the first extension interval m3 and the offset o1 are valid:

$$o1 \le \text{Timing advance/Slot length of a terminal} \le o1 + m3$$

S1130: The terminal device receives a feedback message sent by the network device.

The feedback message is used by the network device to notify the terminal device that the first extension interval and the first offset are received. In addition, the feedback message further includes a first time unit, and the first time unit is a time point that is agreed on by the network device and the terminal device and at which the first extension interval and the first offset start to be used.

Optionally, a sending manner of the first extension interval m1 and the first offset o1 may be directly sending the values are directly sent, sending differences between the values and of current values, sending a sequence number in respective value sets that are of the extension interval and the offset and that are agreed on in advance, or directly sending a set of time units that are unavailable for transmission of the uplink signal. This is not specifically limited in this application.

Specifically, when the sequence number in the respective value sets that are of the extension interval and the offset and that are agreed on in advance are sent, the network device may notify, in advance, the terminal device of a value set of the extension interval or the offset by using RRC signaling. When the extension interval and the offset change, the network device may indicate a configured extension interval or offset by indexing a value set carried in the RRC by using a small quantity of bits in DCI or medium access control signaling (medium access control-control element, MAC-CE).

S1140: The terminal device starts to use the first extension interval and the first offset in the first time unit based on the feedback message.

In the technical solution, there is no special assumption about the network device and a terminal. The technical solution is commonly used, and is applicable to terminal devices and/or network devices with a wider range of specifications.

In the following, this application provides a method for determining an extension interval and an offset by a network device. In the method, there is highest efficiency when a network may obtain a location of a terminal.

Figure 12:
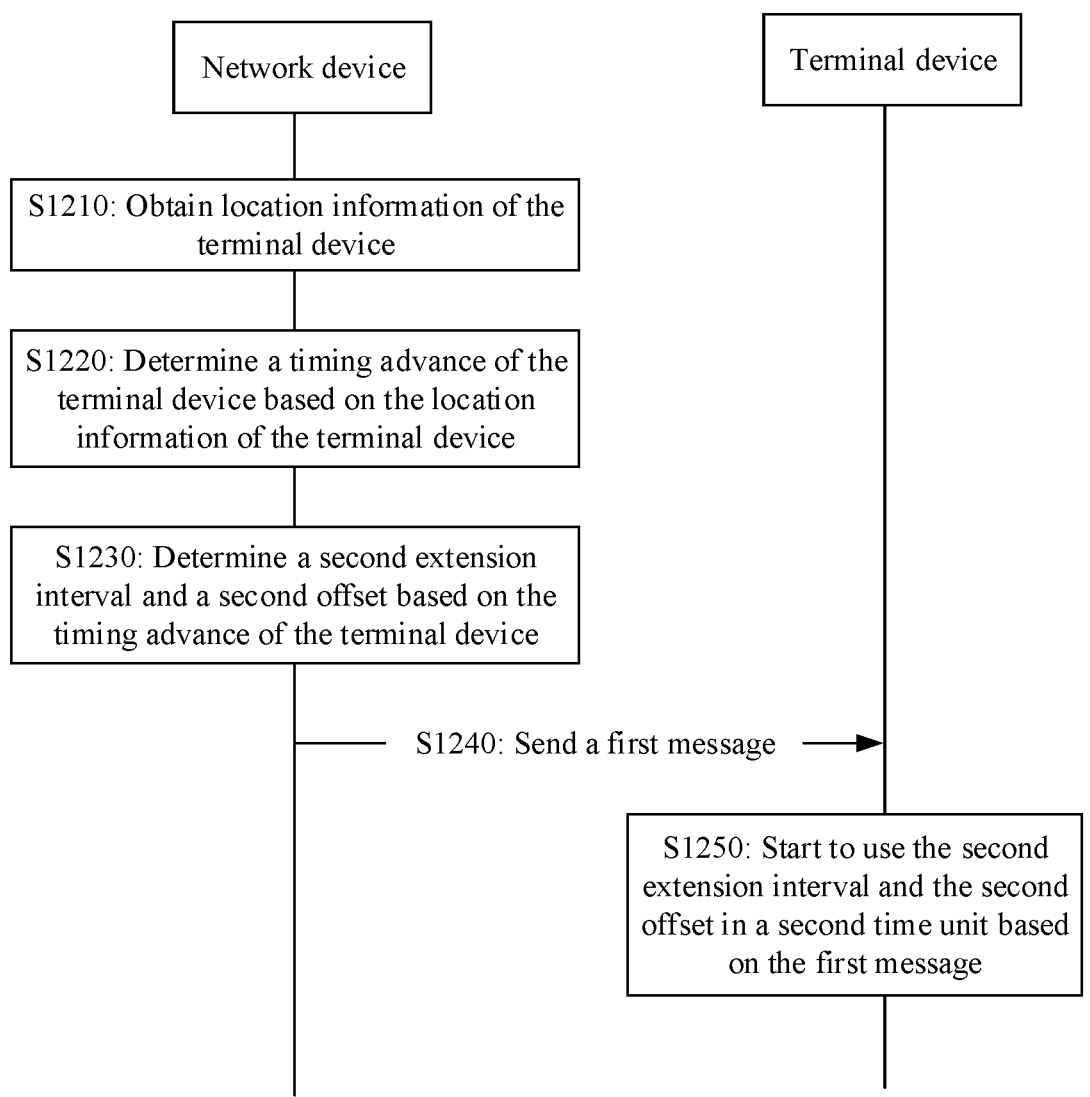
FIG. 12 is a schematic block diagram of a method for determining an uplink timing parameter by a network device according to this application.

FIG. 12 is a schematic block diagram of a method for determining an uplink timing parameter by a network device according to this application.

S1210: The network device obtains location information of a terminal device.

S1220: The network device determines a timing advance of the terminal device based on the location information of the terminal device.

Optionally, the network device determines the timing advance of the terminal device based on the location information of the terminal device and a location and an offset correction value of a satellite. For example, a general framework for calculating the timing advance of the terminal device is as follows:

$$\text{Timing advance of UE} = \|UE\_pos - Sat\_pos\| / c * 2 + \text{common TA}$$

Herein, the common TA (namely, an example of the offset correction value) represents a common TA different from a distance between a non-terrestrial network device such as the satellite and a terminal, UE_pos represents a location of the terminal, Sat_pos represents a location of the non-terrestrial network device such as the satellite, and c represents a speed of light. Both the common TA and Sat_pos are information known to the network device.

S1230: The network device determines a second extension interval m4 and a second offset o2 based on the timing advance of the terminal device.

S1240: The network device sends a first message to the terminal device, where the first message includes a second time unit, the second extension interval, and the second offset.

Correspondingly, the terminal device receives the first message sent by the network device.

The second time unit is a time point that is agreed on by the network device and the terminal device and at which the second extension interval and the second offset start to be used.

Optionally, a notification manner of the second extension interval m2 and the second offset o2 may be directly notifying values, notifying differences between values and current values, notifying a sequence number in respective value sets of the extension interval and the offset that are agreed on in advance, or directly notifying a set of time units that are unavailable for transmission of an uplink signal.

Optionally, the first message may further include a second time length, and the second time length is a time length to which the second extension interval and the second offset can be applied.

S1250: The terminal device starts to use the second extension interval and the second offset in the second time unit based on the first message.

In a random access process, after the terminal device sends an access sequence preamble, the network device sends a random access response (random access response, RAR) (referred to as msg2 in 4-step random access, and referred to as msgb in 2-step random access) to the terminal device, and notifies the terminal device of TA information that needs to be updated. In this case, the network device learns of complete TA information of the terminal device. Therefore, the network device may notify the terminal device of an optimal extension interval and/or an offset that are applicable to the terminal device along with random access response signaling (RAR). The terminal device calculates, by using the extension interval and/or the offset notified in the access response signaling (RAR), a set of time units that are unavailable for transmission of the uplink signal. To save signaling used to indicate a value of an offset in the RAR, a formula used to calculate the offset may also be agreed on.

$$\text{Offset} = \text{floor (Timing advance of a terminal/Slot length)}$$

A function of a floor (x) function is "rounding down", in other words, obtaining a maximum integer not greater than x.

In a deployment in which a coverage beam of the satellite is fixed relative to the ground (commonly referred to as an earth-fixed beam scenario), values of the extension interval and the offset change with time in an obvious change rule. Optionally, the network device may notify the terminal of the change rule. For example, the network device preconfigures a group of values of the extension interval and/or the offset and a corresponding valid time point for the terminal, or notifies the terminal of a change amount of the values of the extension interval and/or the offset every agreed time interval, or notifies the terminal of a group of time units that are unavailable for transmission of the uplink signal and a corresponding valid time point. Based on the configuration, the network device and the terminal update a corresponding configured value at an agreed time point. This method is particularly applicable to the earth-fixed beam scenario.

For interaction and a validity period of a configuration of the extension interval and the offset in the method embodiment, a fallback policy may be configured additionally. To be specific, after the validity period of the extension interval and the offset expires, if the network device does not notify a new configuration parameter, the terminal and the network device agree to fall back to a value (for example, a previous available value) or a set of time units that are unavailable for transmission of the uplink signal. The value or the set may be agreed on by the network device and the terminal in advance.

Optionally, when the network device notifies the terminal of a plurality of possible values of the extension interval m and the offset o, or a set of a plurality of time units that are unavailable for transmission of the uplink signal, the terminal needs to be notified of default values of the extension interval m and the offset o.

Optionally, when one cell includes a plurality of beams, and there are usually a plurality of SSBs, BWPs, or pilot ports in a communications system, each SSB, BWP, and pilot port have respective values of the extension interval m and the offset o, and the network device needs to notify the UE of the configuration by using broadcast information or other signaling.

Optionally, value ranges of the offset that correspond to different beams usually fluctuate in a small range, and there is a large common part. Therefore, offsets of different SSBs, BWPs, or pilot ports may be expressed through differential coding, to reduce broadcast signaling overheads. For example, a cell includes eight SSB beams. A differential notification manner is as follows: {o, o0, o1, o2, o3, o4, o5, o6, o7}. The parameters respectively indicate that a common part of a common offset of the entire cell is o, a common offset of an SSB 0 is o+o0, a common offset of an SSB 1 is o+o1, a common offset of an SSB 2 is o+o2, a common offset of an SSB 3 is o+o3, a common offset of an SSB 4 is o+o4, a common offset of an SSB 5 is o+o5, a common offset of an SSB 6 is o+o6, and a common offset of an SSB 7 is o+o7. After receiving configuration information, the terminal needs to interpret the configuration information based on the foregoing rule.

Optionally, in this embodiment of this application, the offset and the extension interval may be updated and notified together, or only one value of the offset and the extension interval may be updated and notified, and the other value is a default value. The default value may be a currently used value, or may be a cell-level or a beam-level configured value. For example, the extension interval in the cell is always 3 by default. In this case, only a scheduling offset needs to be mentioned for updating or fed back, to reduce signaling overheads.

Optionally, the offset and the extension interval may be further implicitly notified to the terminal by using another configuration parameter. For example, a time length corresponding to a value of the offset cannot be greater than a maximum common timing advance in an application range of the offset. Therefore, if the network notifies the common timing advance, the value of the offset may be derived from the common timing advance:

$$\text{Offset} = \text{floor (Common timing advance/Slot length)}$$

A function of a floor (x) function is "rounding down", in other words, obtaining a maximum integer not greater than x.

Optionally, a value of the extension interval may also be derived based on another parameter. For example, when the network device explicitly or implicitly notifies koffset through configuration, because koffset needs to be greater than the timing advance of the terminal, a sum of the offset and the extension interval is also greater than or equal to the timing advance of the terminal, the value of the extension interval may be derived based on koffset:

$$\text{Extension interval} = \text{koffset} - \text{Offset}$$

Alternatively, $$\text{Extension interval} = \text{koffset} - \text{floor (Common timing advance/Slot length)}$$

It is assumed that a unit of koffset is a slot. If the unit is not a slot, it should be understood that koffset may be converted into a slot or a unit having similar effect of the slot. Such a derivation-based scheme has very good effect when being used to represent a cell-level or beam-level default value, to sufficiently avoid a repeated information definition in a broadcast message, and reduce broadcast signaling overheads.

The foregoing describes in detail the uplink timing method provided in this application, and the following describes a communications apparatus provided in this application.

Figure 13:
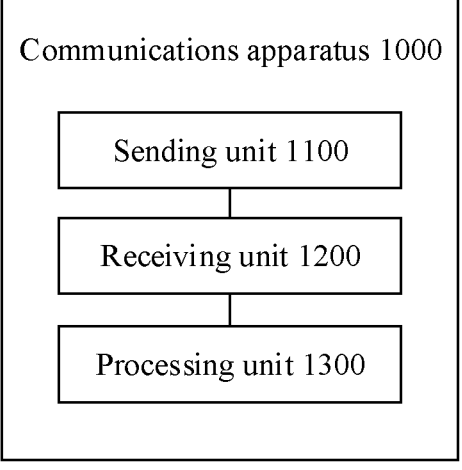
FIG. 13 is a schematic block diagram of a communications apparatus 1000 according to this application.

FIG. 13 is a schematic block diagram of a communications apparatus 1000 according to this application. As shown in FIG. 13, the communications apparatus 1000 includes a receiving unit 1200 and a processing unit 1300.

The receiving unit 1200, configured to receive first configuration information. The first configuration information includes a first set, a scheduling offset of an uplink signal of the communications apparatus, and an extension interval. The first set is a set of time units used by the communications apparatus to receive a downlink system message, and the extension interval is greater than or equal to one time unit.

The processing unit 1300 is configured to determine, based on the scheduling offset of the uplink signal of the communications apparatus and a second set, a time unit for sending the uplink signal. The second set is a set of time units that are determined based on the extension interval and the first set and that are unavailable for transmission of the uplink signal.

Optionally, a set of time points corresponding to the time units in the second set in an uplink time sequence of the first communications apparatus includes a set of time points corresponding to all the time units in the first set in a downlink time sequence of the first communications apparatus.

Optionally, that the second set is a set of time units that are determined based on the extension interval and the first set and that are unavailable for transmission of the uplink signal specifically includes: when the extension interval is m1 time units, the second set is a union set of each time unit in the first set and m1 consecutive time units after each time unit, where m1 is greater than or equal to a maximum timing advance in an area in which the first communications apparatus is located, or m1 is greater than or equal to a maximum timing advance of the first communications apparatus in a first time period.

Optionally, the first configuration information further includes an offset o, and that the second set is a set of time units that are determined based on the extension interval and the first set and that are unavailable for transmission of the uplink signal specifically includes: when the extension interval is m2 time units, the second set is a union set of each time unit in a third set and m2 consecutive time units after each time unit, and the third set is a set obtained by backward offsetting each time unit in the first set based on the offset o, where a sum of m2 and o is greater than or equal to a maximum timing advance in an area in which the first communications apparatus is located, and the offset o is less than or equal to a maximum common timing advance in the area in which the first communications apparatus is located; or a sum of m2 and o is greater than or equal to a maximum timing advance of the first communications apparatus in a second time period, and the offset o is less than or equal to a maximum common timing advance of the first communications apparatus in the second time period.

Optionally, the communications apparatus 1000 may further include a sending unit 1100, configured to perform a sending action performed by a terminal device.

Optionally, the processing unit 1300 is further configured to determine a first extension interval and a first offset; the sending unit 1100 is configured to send the first extension interval and the first offset to a second communications apparatus, where a sum of the first extension interval and the first offset is greater than or equal to a timing advance of the first communications apparatus, and the first offset is less than or equal to the timing advance of the first communications apparatus; the receiving unit 1200 is further configured to receive a feedback message sent by the second communications apparatus, where the feedback message includes a first time unit; and the processing unit 1300 is further configured to start to use the first extension interval and the first offset in the first time unit based on the feedback information.

Optionally, the sending unit 1100 is further configured to send a first time length to the second communications apparatus. The first time length is a time length in which the first extension interval and the first offset are valid.

Optionally, the receiving unit 1200 is further configured to receive a first message sent by the second communications apparatus, where the first message includes a second time unit, a second extension interval, and a second offset, where the second time unit is a time unit in which the first communications apparatus starts to use the second extension interval and the second offset, the second extension interval and the second offset are determined by the second communications apparatus based on a timing advance of the first communications apparatus, and the timing advance of the first communications apparatus is determined by the second communications apparatus based on location information of the first communications apparatus; and the processing unit 1300 is further configured to start to use the second extension interval and the second offset in the second time unit based on the first message.

Optionally, the first message further includes a second time length, and the second time length is a time length in which the second extension interval and the second offset are valid.

Optionally, the first set is a set of sequence numbers corresponding to all the time units in the first set.

Optionally, for each time unit in the first set, 0 or 1 is used to indicate that a corresponding time unit is a time unit for receiving the downlink system message.

Optionally, when a parameter in the first configuration information needs to be adjusted, the receiving unit 1200 is configured to receive second configuration information. The second configuration information includes at least one updated parameter of the first set, the scheduling offset of the uplink signal of the communications apparatus, and the extension interval.

In some other solutions, units of the communications apparatus 1000 are further configured to perform the following steps and/or operations.

The receiving unit 1200 is configured to receive a second set and a scheduling offset of an uplink signal of the communications apparatus. The second set is a set of time units that are determined based on an extension interval and a first set and that are unavailable for transmission of the uplink signal, the first set is a set of time units used by the communications apparatus to receive a downlink system message, and the extension interval is greater than or equal to one time unit.

The processing unit 1300 is configured to determine, based on the scheduling offset and the second set, a time unit for sending the uplink signal.

Optionally, a set of time points corresponding to the time units in the second set in an uplink time sequence of the first communications apparatus includes a set of time points corresponding to all the time units in the first set in a downlink time sequence of the first communications apparatus.

Optionally, that the second set is a set of time units that are determined based on an extension interval and a first set and that are unavailable for transmission of the uplink signal specifically includes: when the extension interval is m1 time units, the second set is a union set of each time unit in the first set and m1 consecutive time units after each time unit, where m1 is greater than or equal to a maximum timing advance in an area in which the first communications apparatus is located, or m1 is greater than or equal to a maximum timing advance of the first communications apparatus in a first time period.

Optionally, that the second set is a set of time units that are determined based on an extension interval and a first set and that are unavailable for transmission of the uplink signal specifically includes: when the extension interval is m2 time units, the second set is a union set of each time unit in a third set and m2 consecutive time units after each time unit, and the third set is a set obtained by backward offsetting each time unit in the first set based on an offset o, where a sum of m2 and o is greater than or equal to a maximum timing advance in an area in which the first communications apparatus is located, and the offset o is less than or equal to a maximum common timing advance in the area in which the first communications apparatus is located; or a sum of m2 and o is greater than or equal to a maximum timing advance of the first communications apparatus in a second time period, and the offset o is less than or equal to a maximum common timing advance of the first communications apparatus in the second time period.

Optionally, the first set is a set of sequence numbers corresponding to all the time units in the first set.

Optionally, for each time unit in the first set, 0 or 1 is used to indicate that a corresponding time unit is a time unit for receiving the downlink system message.

Optionally, the sending unit 1100 and the receiving unit 1200 may also be integrated into one transceiver unit, and have both a receiving function and a sending function. This is not limited herein.

In an implementation, the communications apparatus 1000 may be the terminal device in the method embodiments. In this implementation, the sending unit 1100 may be a transmitter, and the receiving unit 1200 may be a receiver. The receiver and the transmitter may also be integrated into a transceiver. The processing unit 1300 may be a processing apparatus.

In another implementation, the communications apparatus 1000 may be a chip or an integrated circuit installed in a terminal device. In this case, the receiving unit 1200 and the sending unit 1100 may be a communications interface or an interface circuit. For example, the sending unit 1100 is an output interface or an output circuit, the receiving unit 1200 is an input interface or an input circuit, and the processing unit 1300 may be a processing apparatus.

A function of the processing apparatus may be implemented by using hardware, or may be implemented by hardware executing corresponding software. For example, the processing apparatus may include a memory and a processor. The memory is configured to store a computer program, and the processor reads and executes the computer program stored in the memory, so that the communications apparatus 1000 performs an operation and/or processing performed by the terminal device in the method embodiments. Optionally, the processing apparatus may include only the processor, and the memory configured to store the computer program is located outside the processing apparatus. The processor is connected to the memory through a circuit/wire, to read and execute the computer program stored in the memory. For another example, the processing device may be a chip or an integrated circuit.

Figure 14:
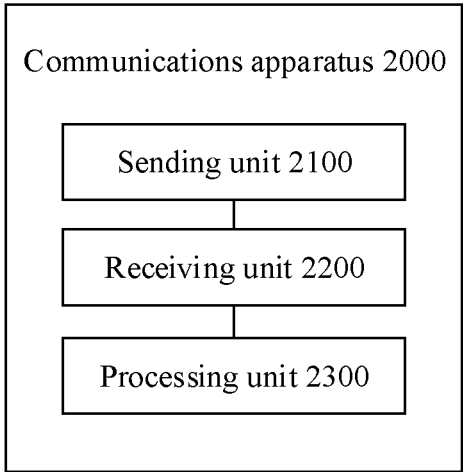
FIG. 14 is a schematic block diagram of a communications apparatus 2000 according to this application.

FIG. 14 is a schematic block diagram of a communications apparatus 2000 according to this application. As shown in FIG. 14, the communications apparatus 2000 includes a sending unit 2100 and a processing unit 2300.

The sending unit 2100 is configured to send first configuration information. The first configuration information includes a first set, a scheduling offset of an uplink signal of a terminal device, and an extension interval. The first set is a set of time units used by the terminal device to receive a downlink system message, and the extension interval is greater than or equal to one time unit.

The processing unit 2300 is configured to determine, based on the scheduling offset of the uplink signal of the terminal device and a second set, a time unit for receiving the uplink signal. The second set is a set of time units that are determined based on the extension interval and the first set and that are unavailable for transmission of the uplink signal.

Optionally, a set of time points corresponding to the time units in the second set in an uplink time sequence of the first communications apparatus includes a set of time points corresponding to all the time units in the first set in a downlink time sequence of the first communications apparatus.

Optionally, that the second set is a set of time units that are determined based on the extension interval and the first set and that are unavailable for transmission of the uplink signal specifically includes: when the extension interval is m1 time units, the second set is a union set of each time unit in the first set and m1 consecutive time units after each time unit.

Optionally, the first configuration information further includes an offset o, and that the second set is a set of time units that are determined based on the extension interval and the first set and that are unavailable for transmission of the uplink signal specifically includes: when the extension interval is m2 time units, the second set is a union set of each time unit in a third set and m2 consecutive time units after each time unit, and the third set is a set obtained by backward offsetting each time unit in the first set based on the offset o, where a sum of m2 and o is greater than or equal to a maximum timing advance in an area in which the first communications apparatus is located, and the offset o is less than or equal to a maximum common timing advance in the area in which the first communications apparatus is located; or a sum of m2 and o is greater than or equal to a maximum timing advance of the first communications apparatus in a second time period, and the offset o is less than or equal to a maximum common timing advance of the first communications apparatus in the second time period.

Optionally, the communications apparatus 2000 may further include a receiving unit 2200, configured to perform a receiving action performed by a network device.

Optionally, the receiving unit 2200 is configured to receive a first extension interval and a first offset that are sent by the first communications, where the first extension interval and the first offset are determined by the first communications apparatus; and the sending unit 2100 is further configured to send a feedback message to the first communications apparatus, where the feedback message includes a first time unit, and the first time unit is a time unit in which the first communications apparatus starts to use the first extension interval and the first offset.

Optionally, the receiving unit 2200 is further configured to receive a first time length sent by the first communications apparatus. The first time length is a time length in which the first extension interval and the first offset are valid.

Optionally, the processing unit 2300 is configured to: obtain location information of the first communications apparatus; determine a timing advance of the first communications apparatus based on the location information; and determine a second extension interval and a second offset based on the timing advance of the first communications apparatus. The sending unit 2100 is further configured to send a first message to the first communications apparatus, where the first message includes a second time unit, a second extension interval, and a second offset, and the second time unit is a time unit in which the first communications apparatus starts to use the second extension interval and the second offset.

Optionally, the first message further includes a second time length, and the second time length is a time length in which the second extension interval and the second offset are valid.

Optionally, the first set is a set of sequence numbers corresponding to all the time units in the first set.

Optionally, for each time unit in the first set, 0 or 1 is used to indicate that a corresponding time unit is a time unit for receiving the downlink system message.

Optionally, when a parameter in the first configuration information needs to be adjusted, the sending unit 2100 is configured to send second configuration information. The second configuration information includes at least one updated parameter of the first set, the scheduling offset of the uplink signal of the terminal device, and the extension interval.

In some other solutions, units of the communications apparatus 2000 are further configured to perform the following steps and/or operations.

The processing unit 2300 is configured to determine a second set based on an extension interval and a first set. The second set is a set of time units that are determined based on the extension interval and the first set and that are unavailable for transmission of an uplink signal. The first set is a set of time units used by a terminal device to receive a downlink system message, and the extension interval is greater than or equal to one or more time units.

The sending unit 2100 is configured to send the second set and a scheduling offset of an uplink signal of the terminal device to the terminal device.

The processing unit 2300 is further configured to determine, based on the scheduling offset and the second set, a time unit for receiving the uplink signal.

Optionally, a set of time points corresponding to the time units in the second set in an uplink time sequence of the first communications apparatus includes a set of time points corresponding to all the time units in the first set in a downlink time sequence of the first communications apparatus.

Optionally, that the second set is a set of time units that are determined based on the extension interval and the first set and that are unavailable for transmission of an uplink signal specifically includes: when the extension interval is m1 time units, the second set is a union set of each time unit in the first set and m1 consecutive time units after each time unit, where m1 is greater than or equal to a maximum timing advance in an area in which the first communications apparatus is located, or m1 is greater than or equal to a maximum timing advance of the first communications apparatus in a first time period.

Optionally, that the second set is a set of time units that are determined based on the extension interval and the first set and that are unavailable for transmission of an uplink signal specifically includes: when the extension interval is m2 time units, the second set is a union set of each time unit in a third set and m2 consecutive time units after each time unit, and the third set is a set obtained by backward offsetting each time unit in the first set based on an offset o, where a sum of m2 and o is greater than or equal to a maximum timing advance in an area in which the first communications apparatus is located, and the offset o is less than or equal to a maximum common timing advance in the area in which the first communications apparatus is located; or a sum of m2 and o is greater than or equal to a maximum timing advance of the first communications apparatus in a second time period, and the offset o is less than or equal to a maximum common timing advance of the first communications apparatus in the second time period.

Optionally, the first set is a set of sequence numbers corresponding to all the time units in the first set.

Optionally, for each time unit in the first set, 0 or 1 is used to indicate that a corresponding time unit is a time unit for receiving the downlink system message.

Optionally, the sending unit 2100 and the receiving unit 2200 may also be integrated into one transceiver unit, and have both a receiving function and a sending function. This is not limited herein.

In an implementation, the communications apparatus 2000 may be the network device in the method embodiments. In this implementation, the sending unit 2100 may be a transmitter, and the receiving unit 2200 may be a receiver. The receiver and the transmitter may also be integrated into a transceiver. The processing unit 2300 may be a processing apparatus.

In another implementation, the communications apparatus 2000 may be a chip or an integrated circuit installed in the network device. In this case, the receiving unit 2200 and the sending unit 2100 may be a communications interface or an interface circuit. For example, the sending unit 2100 is an output interface or an output circuit, the receiving unit 2200 is an input interface or an input circuit, and the processing unit 2300 may be a processing apparatus.

A function of the processing apparatus may be implemented by using hardware, or may be implemented by hardware executing corresponding software. For example, the processing apparatus may include a memory and a processor. The memory is configured to store a computer program, and the processor reads and executes the computer program stored in the memory, so that the communications apparatus 2000 performs an operation and/or processing performed by the network device in the method embodiments. Optionally, the processing apparatus may include only the processor, and the memory configured to store the computer program is located outside the processing apparatus. The processor is connected to the memory through a circuit/wire, to read and execute the computer program stored in the memory. For another example, the processing device may be a chip or an integrated circuit.

Figure 15:
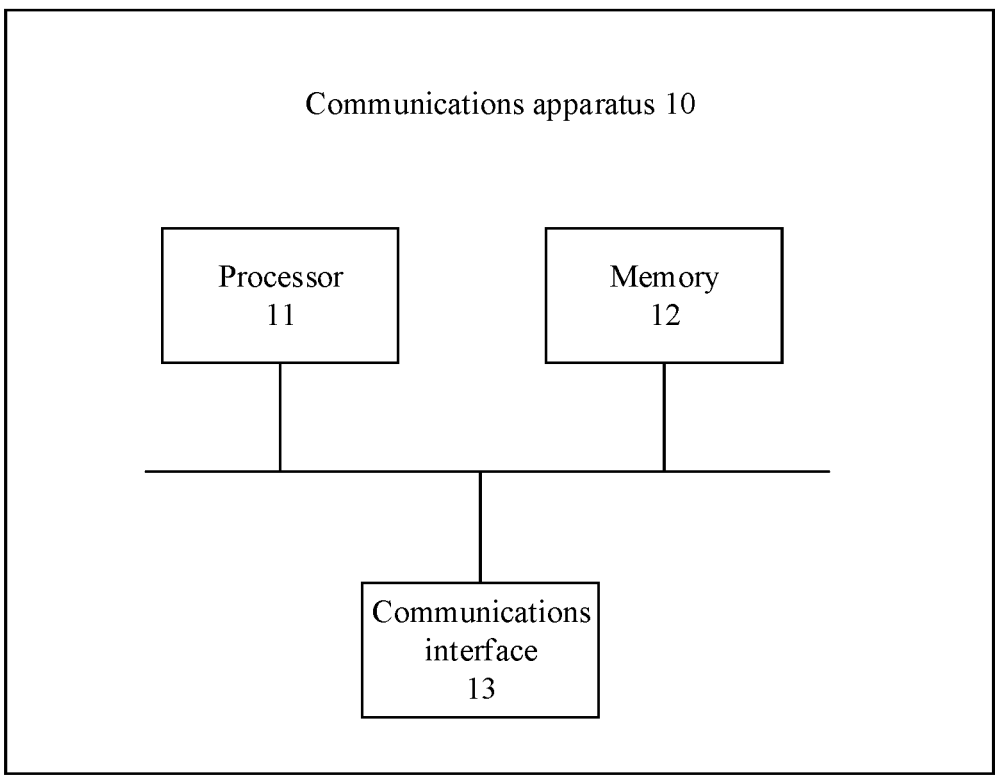
FIG. 15 is a schematic diagram of a structure of a communications apparatus 10 according to this application.

FIG. 15 is a schematic diagram of a structure of a communications apparatus 10 according to this application. As shown in FIG. 15, the communications apparatus 10 includes one or more processors 11, one or more memories 12, and one or more communications interfaces 13. The processor 11 is configured to control the communications interface 13 to send or receive a signal, the memory 12 is configured to store a computer program, and the processor 11 is configured to invoke and run the computer program from the memory 12, so that a procedure and/or an operation performed by a terminal device in the method embodiments of this application are/is performed.

For example, the processor 11 may have a function of the processing unit 1300 shown in FIG. 13, and the communications interface 13 may have a function of the sending unit 1100 and/or the receiving unit 1200 shown in FIG. 8. Specifically, the processor 11 may be configured to perform processing or an operation performed inside the terminal device in the method embodiments of this application, and the communications interface 13 is configured to perform a sending action and/or a receiving action performed by the terminal device in the method embodiments of this application.

In an implementation, the communications apparatus 10 may be the terminal device in the method embodiments. In this implementation, the communications interface 13 may be a transceiver. The transceiver may include a receiver and a transmitter.

Optionally, the processor 11 may be a baseband apparatus, and the communications interface 13 may be a radio frequency apparatus.

In another implementation, the communications apparatus 10 may be a chip installed in the terminal device. In this implementation, the communications interface 13 may be an interface circuit or an input/output interface.

Figure 16:
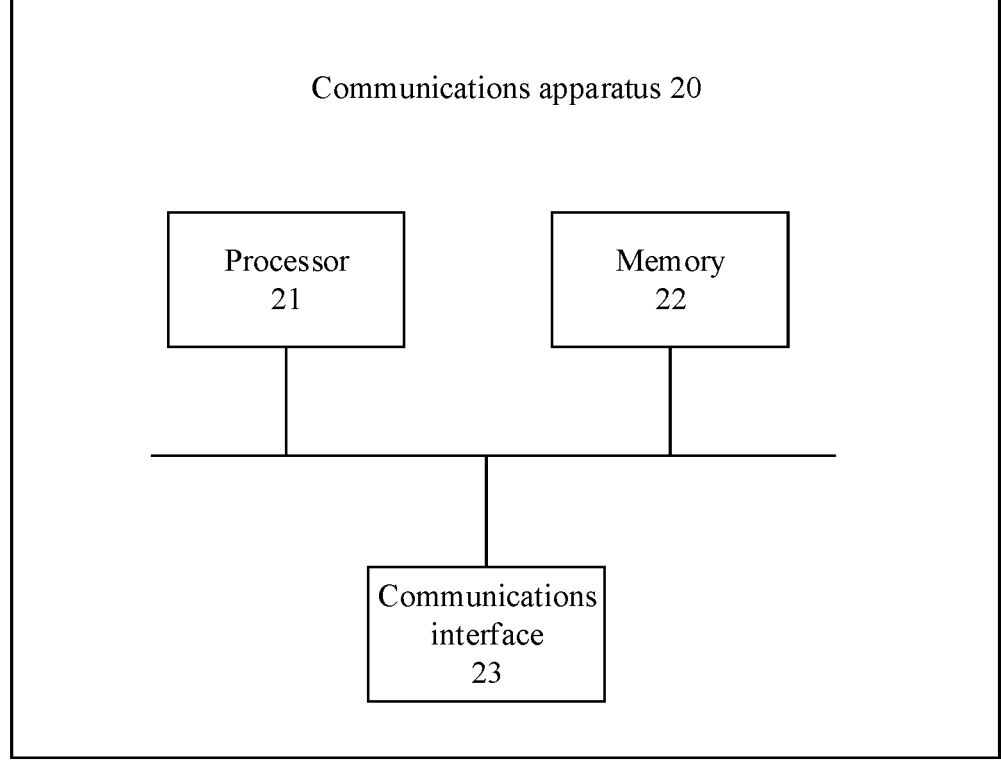
FIG. 16 is a schematic diagram of a structure of a communications apparatus 20 according to this application.

FIG. 16 is a schematic diagram of a structure of a communications apparatus 20 according to this application. As shown in FIG. 16, the communications apparatus 20 includes one or more processors 21, one or more memories 22, and one or more communications interfaces 23. The processor 21 is configured to control the communications interface 23 to send or receive a signal, the memory 22 is configured to store a computer program, and the processor 21 is configured to invoke and run the computer program from the memory 22, so that a procedure and/or an operation performed by a network device in the method embodiments of this application are/is performed.

For example, the processor 21 may have a function of the processing unit 2300 shown in FIG. 14, and the communications interface 23 may have a function of the sending unit 2100 and the receiving unit 2200 shown in FIG. 14. Specifically, the processor 21 may be configured to perform processing or an operation performed inside the network device in the method embodiments of this application, and the communications interface 23 is configured to perform a sending action and/or a receiving action performed by the network device in the method embodiments of this application. Details are not described herein again.

Optionally, the processor and the memory in the apparatus embodiments may be physically independent units, or the memory and the processor may be integrated together. This is not limited herein.

In addition, this application further provides a computer-readable storage medium. The computer-readable storage medium stores computer instructions. When the computer instructions run on a computer, an operation and/or a procedure performed by a terminal device in the method embodiments of this application are/is performed.

This application further provides a computer-readable storage medium. The computer-readable storage medium stores computer instructions. When the computer instructions run on a computer, an operation and/or a procedure performed by a network device in the method embodiments of this application are/is performed.

This application further provides a computer program product. The computer program product includes computer program code or instructions. When the computer program code or the instructions run on a computer, an operation and/or a procedure performed by a terminal device in the method embodiments of this application are/is performed.

This application further provides a computer program product. The computer program product includes computer program code or instructions. When the computer program code or the instructions run on a computer, an operation and/or a procedure performed by a network device in the method embodiments of this application are/is performed.

In addition, this application further provides a chip. The chip includes a processor. A memory configured to store a computer program is disposed independently of the chip, and a processor is configured to execute the computer program stored in the memory, so that an operation and/or processing performed by a terminal device in any method embodiment are/is performed.

Further, the chip may further include a communications interface. The communications interface may be an input/output interface, or may be an interface circuit, or the like. Further, the chip may further include the memory.

This application further provides a chip. The chip includes a processor. A memory configured to store a computer program is disposed independently of the chip, and a processor is configured to execute the computer program stored in the memory, so that an operation and/or processing performed by a network device in any method embodiment are/is performed.

Further, the chip may further include a communications interface. The communications interface may be an input/output interface, or may be an interface circuit, or the like. Further, the chip may further include the memory.

In addition, this application further provides a communications system, including a terminal device and a network device in embodiments of this application.

A processor in embodiments of this application may be an integrated circuit chip, and has a signal processing capability. In an implementation process, steps in the foregoing method embodiments are implemented by using a hardware integrated logic circuit in the processor, or by using instructions in a form of software. The processor may be a general-purpose processor, a digital signal processor (Digital Signal Processor, DSP), an application-specific integrated circuit (application-specific integrated circuit, ASIC), a field programmable gate array (Field Programmable Gate Array, FPGA) or another programmable logic device, a discrete gate or transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory in embodiments of this application may be a volatile memory or a non-volatile memory, or may include a volatile memory and a non-volatile memory. The nonvolatile memory may be a read-only memory (read-only memory, ROM), a programmable read-only memory (programmable ROM, PROM), an erasable programmable read only memory (erasable PROM, EPROM), an electrically erasable programmable read-only memory (electrically erasable EPROM, EEPROM), or a flash. The volatile memory may be a random access memory (random access memory, RAM), used as an external cache. Based on description used as an example instead of a limitation, RAMs in a plurality of forms are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DRRAM). It should be noted that the memory in the systems and methods described in this specification includes but is not limited to these and any memory of another appropriate type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

The term "and/or" in this specification describes only an association relationship for describing associated objects and represents that three relationships may exist. For example, A and/or B may represent the following three cases: Only A exists, both A and B exist, and only B exists. A, B, and C may be singular or plural. This is not limited.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

receiving, by a first communications apparatus, first configuration information sent by a second communications apparatus, wherein the first configuration information comprises a first set, a scheduling offset of an uplink signal of the first communications apparatus, and an extension interval, and wherein the first set comprises time units used by the first communications apparatus to receive a downlink system message, and the extension interval is greater than or equal to one time unit; and determining, by the first communications apparatus based on the scheduling offset of the uplink signal of the first communications apparatus and a second set, a time unit for sending the uplink signal, wherein the second set comprises time units that are determined based on the extension interval and the first set and that are unavailable for transmission of the uplink signal, wherein the first configuration information further comprises an offset o, wherein, in response to the extension interval being m2 time units, the second set comprises a union set of each time unit in a third set and m2 consecutive time units after each time unit in the third set, and the third set is obtained by backward offsetting each time unit in the first set based on the offset, and wherein:

a sum of m2 and o is greater than or equal to a maximum timing advance in an area in which the first communications apparatus is located, and the offset o is less than or equal to a maximum common timing advance in the area in which the first communications apparatus is located; or a sum of m2 and o is greater than or equal to a maximum timing advance of the first communications apparatus in a second time period, and the offset o is less than or equal to a maximum common timing advance of the first communications apparatus in the second time period.

2. The method according to claim 1, wherein a set of time points corresponding to the time units in the second set in an uplink time sequence of the first communications apparatus correspond to all the time units in the first set in a downlink time sequence of the first communications apparatus.

3. The method according to claim 1, wherein, in response to the extension interval being m1 time units, the second set comprises a union set of each time unit in the first set and m1 consecutive time units after each time unit in the first set, wherein m1 is greater than or equal to a maximum timing advance in an area in which the first communications apparatus is located, or m1 is greater than or equal to a maximum timing advance of the first communications apparatus in a first time period.

4. The method according to claim 1, wherein the method further comprises:

determining, by the first communications apparatus, a first extension interval and a first offset;

sending, by the first communications apparatus, the first extension interval and the first offset to the second communications apparatus, wherein a sum of the first extension interval and the first offset is greater than or equal to a timing advance of the first communications apparatus, and the first offset is less than or equal to the timing advance of the first communications apparatus;

receiving, by the first communications apparatus, a feedback message sent by the second communications apparatus, wherein the feedback message comprises a first time unit; and starting, by the first communications apparatus, to use the first extension interval and the first offset in the first time unit based on the feedback message.

5. The method according to claim 4, wherein the method further comprises:

sending, by the first communications apparatus, a first time length to the second communications apparatus, wherein the first time length is a time length in which the first extension interval and the first offset are valid.

6. The method according to claim 1, wherein the method further comprises:

receiving, by the first communications apparatus, a first message sent by the second communications apparatus, wherein the first message comprises a second time unit, a second extension interval, and a second offset, wherein the second time unit is a time unit in which the first communications apparatus starts to use the second extension interval and the second offset, the second extension interval and the second offset are determined by the second communications apparatus based on a timing advance of the first communications apparatus, and the timing advance of the first communications apparatus is determined by the second communications apparatus based on location information of the first communications apparatus; and starting, by the first communications apparatus, to use the second extension interval and the second offset in the second time unit based on the first message.

7. The method according to claim 1, wherein the method further comprises:

to adjust a parameter in the first configuration information, receiving, by the first communications apparatus, second configuration information, wherein the second configuration information comprises at least one updated parameter of the first set, the scheduling offset of the uplink signal of the first communications apparatus, and the extension interval.

8. An uplink timing method, comprising:

receiving, by a first communications apparatus, a second set and a scheduling offset of an uplink signal of the first communications apparatus,

wherein the second set comprises time units that are determined based on an extension interval and a first set and that are unavailable for transmission of the uplink signal, and wherein the first set comprises time units used by the first communications apparatus to receive a downlink system message, and the extension interval is greater than or equal to one time unit; and determining, by the first communications apparatus based on the scheduling offset and the second set, a time unit for sending the uplink signal, wherein, in response to the extension interval being m2 time units, the second set comprises a union set of each time unit in a third set and m2 consecutive time units after each time unit in the third set, and the third set is obtained by backward offsetting each time unit in the first set based on an offset o, and wherein:

a sum of m2 and o is greater than or equal to a maximum timing advance in an area in which the first communications apparatus is located, and the offset o is less than or equal to a maximum common timing advance in the area in which the first communications apparatus is located; or a sum of m2 and o is greater than or equal to a maximum timing advance of the first communications apparatus in a second time period, and the offset o is less than or equal to a maximum common timing advance of the first communications apparatus in the second time period.

9. The method according to claim 8, wherein a set of time points corresponding to the time units in the second set in an uplink time sequence of the first communications apparatus correspond to all the time units in the first set in a downlink time sequence of the first communications apparatus.

10. The method according to claim 8, wherein, in response to the extension interval being m1 time units, the second set comprises a union set of each time unit in the first set and m1 consecutive time units after each time unit in the first set, wherein m1 is greater than or equal to a maximum timing advance in an area in which the first communications apparatus is located, or m1 is greater than or equal to a maximum timing advance of the first communications apparatus in a first time period.

11. A first communications apparatus, comprising:

a receiving unit, configured to receive first configuration information sent by a second communications apparatus, wherein the first configuration information comprises a first set, a scheduling offset of an uplink signal of the first communications apparatus, and an extension interval, and wherein the first set comprises time units used by the first communications apparatus to receive a downlink system message, and the extension interval is greater than or equal to one time unit; and a processing unit, configured to determine, based on the scheduling offset of the uplink signal of the first communications apparatus and a second set, a time unit for sending the uplink signal, wherein the second set comprises time units that are determined based on the extension interval and the first set and that are unavailable for transmission of the uplink signal, wherein the first configuration information further comprises an offset o, wherein, in response to the extension interval being m2 time units, the second set comprises a union set of each time unit in a third set and m2 consecutive time units after each time unit in the third set, and the third set is obtained by backward offsetting each time unit in the first set based on the offset o, and wherein:

a sum of m2 and o is greater than or equal to a maximum timing advance in an area in which the first communications apparatus is located, and the offset o is less than or equal to a maximum common timing advance in the area in which the first communications apparatus is located; or a sum of m2 and o is greater than or equal to a maximum timing advance of the first communications apparatus in a second time period, and the offset o is less than or equal to a maximum common timing advance of the first communications apparatus in the second time period.

12. The first communications apparatus according to claim 11, wherein a set of time points corresponding to the time units in the second set in an uplink time sequence of the first communications apparatus correspond to all the time units in the first set in a downlink time sequence of the first communications apparatus.

13. The first communications apparatus according to claim 11, wherein, in response to the extension interval being m1 time units, the second set comprises a union set of each time unit in the first set and m1 consecutive time units after each time unit in the first set, wherein m1 is greater than or equal to a maximum timing advance in an area in which the first communications apparatus is located, or m1 is greater than or equal to a maximum timing advance of the first communications apparatus in a first time period.

14. The first communications apparatus according to claim 11, wherein the processing unit is further configured to determine a first extension interval and a first offset, and wherein the first communications apparatus further comprises a sending unit configured to send the first extension interval and the first offset to the second communications apparatus, wherein a sum of the first extension interval and the first offset is greater than or equal to a timing advance of the first communications apparatus, and the first offset is less than or equal to the timing advance of the first communications apparatus, wherein the receiving unit is further configured to receive a feedback message sent by the second communications apparatus, wherein the feedback message comprises a first time unit, and wherein the processing unit is further configured to start to use the first extension interval and the first offset in the first time unit based on the feedback message.

15. The first communications apparatus according to claim 14, wherein the sending unit is further configured to send a first time length to the second communications apparatus, wherein the first time length is a time length in which the first extension interval and the first offset are valid.

16. The first communications apparatus according to claim 11, wherein the receiving unit is further configured to receive a first message sent by the second communications apparatus, wherein the first message comprises a second time unit, a second extension interval, and a second offset, wherein:

the second time unit is a time unit in which the first communications apparatus starts to use the second extension interval and the second offset, the second extension interval and the second offset are determined by the second communications apparatus based on a timing advance of the first communications apparatus, and the timing advance of the first communications apparatus is determined by the second communications apparatus based on location information of the first communications apparatus; and the processing unit is further configured to start to use the second extension interval and the second offset in the second time unit based on the first message.

17. The first communications apparatus according to claim 13, wherein, to adjust a parameter in the first configuration information, the receiving unit is further configured to receive second configuration information, wherein the second configuration information comprises at least one updated parameter of the first set, the scheduling offset of the uplink signal of the first communications apparatus, and the extension interval.

\* \* \* \* \*